United States Patent [19]

Yasuda et al.

[11] Patent Number: 5,594,311
[45] Date of Patent: Jan. 14, 1997

[54] LENS CONTROLLING APPARATUS

[75] Inventors: Hitoshi Yasuda, Tokyo; Masahide Hirasawa, Kanagawa-ken, both of Japan

[73] Assignee: Canon Kabushiki Kaisha, Tokyo, Japan

[21] Appl. No.: 258,762

[22] Filed: Jun. 13, 1994

[30] Foreign Application Priority Data

Jun. 15, 1993 [JP] Japan .................................. 5-143631
Jun. 30, 1993 [JP] Japan .................................. 5-161025

[51] Int. Cl.$^6$ ................................................. G05B 19/40
[52] U.S. Cl. ........................... 318/685; 318/696; 318/447
[58] Field of Search ............................... 318/685, 696, 318/608, 254, 446–7

[56] References Cited

U.S. PATENT DOCUMENTS 3,601,678 8/1971 Abraham .................................. 318/685
4,272,712 6/1981 Beling et al. ............................ 318/696
4,933,985 6/1990 Fukushima ............................... 318/813
5,285,141 2/1994 Hwang ..................................... 318/608

Primary Examiner—David S. Martin
Attorney, Agent, or Firm—Robin, Blecker, Daley & Driscoll

[57] ABSTRACT

A lens controlling apparatus includes a lens-driving stepping motor, a driving current forming circuit for forming a driving current waveform to be supplied to the stepping motor, an inputting circuit for inputting a stop instruction to stop the lens-driving stepping motor, a stopping circuit for performing the operation of stopping the stepping motor in accordance with the stop instruction, a phase detecting circuit for detecting the phase of the driving current waveform to be supplied to the stepping motor, and an inhibiting circuit for inhibiting the stop instruction from being executed except when the phase of the driving current waveform detected by the phase detecting circuit is a predetermined phase.

22 Claims, 24 Drawing Sheets

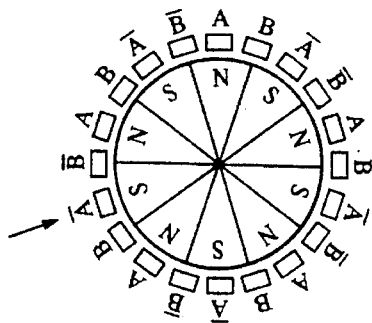
FIG. IA
(PRIOR ART)
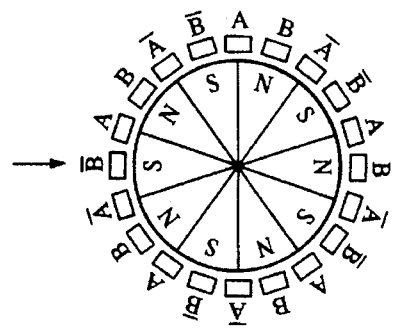
FIG. IB
(PRIOR ART)
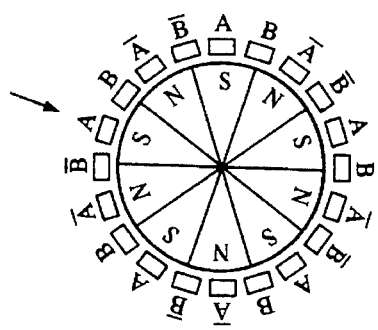
FIG. IC
(PRIOR ART)
FIG. ID
(PRIOR ART)

FIG.7
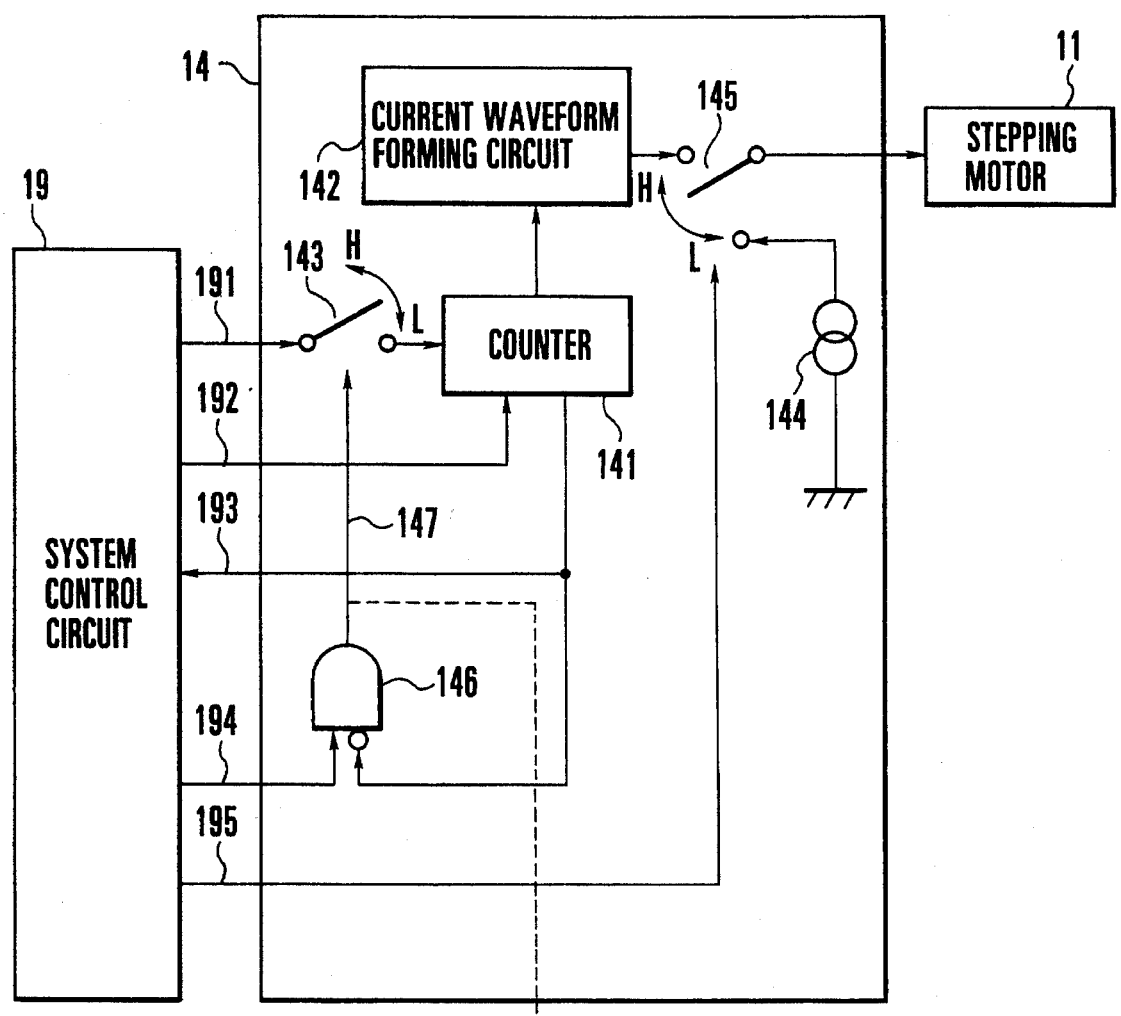
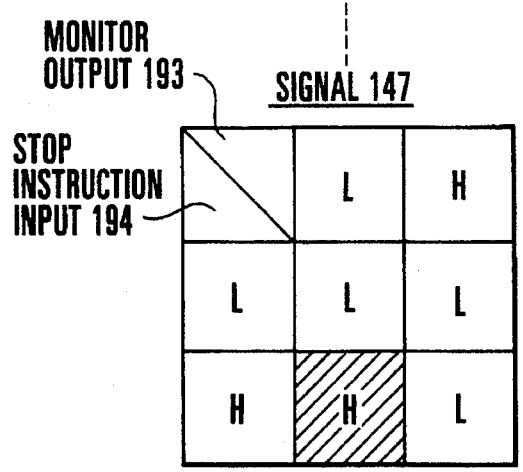

FIG. 8A
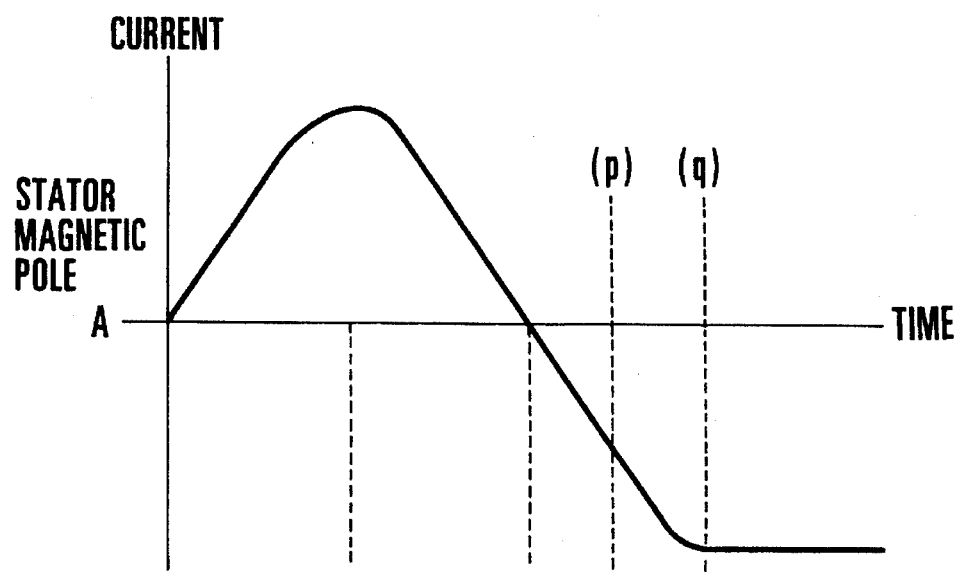
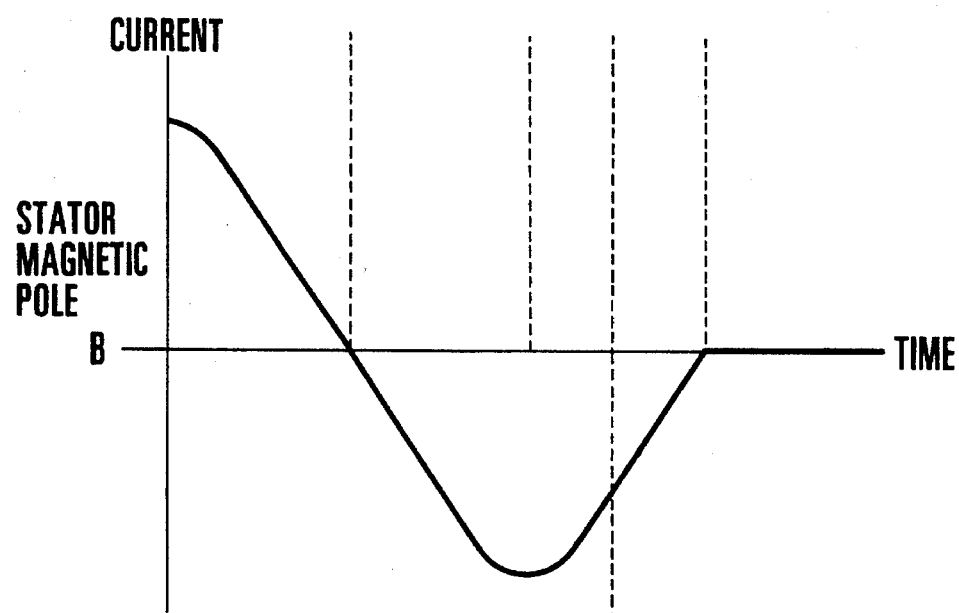
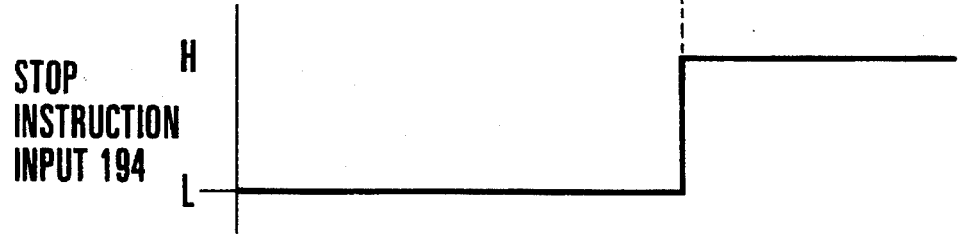
FIG. 8B

FIG.9
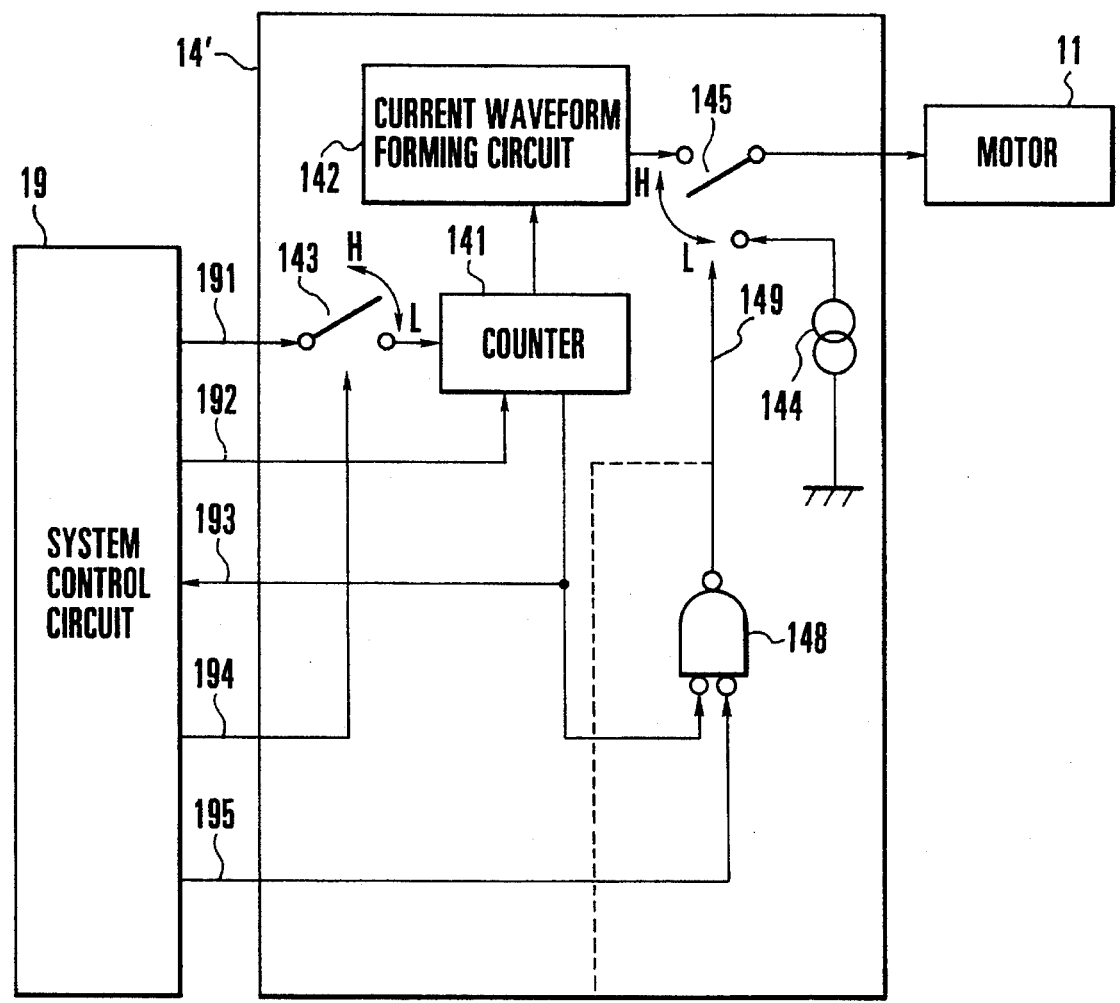
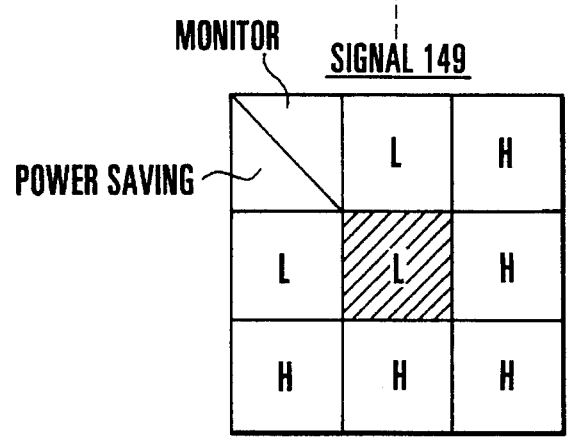

FIG. 10A
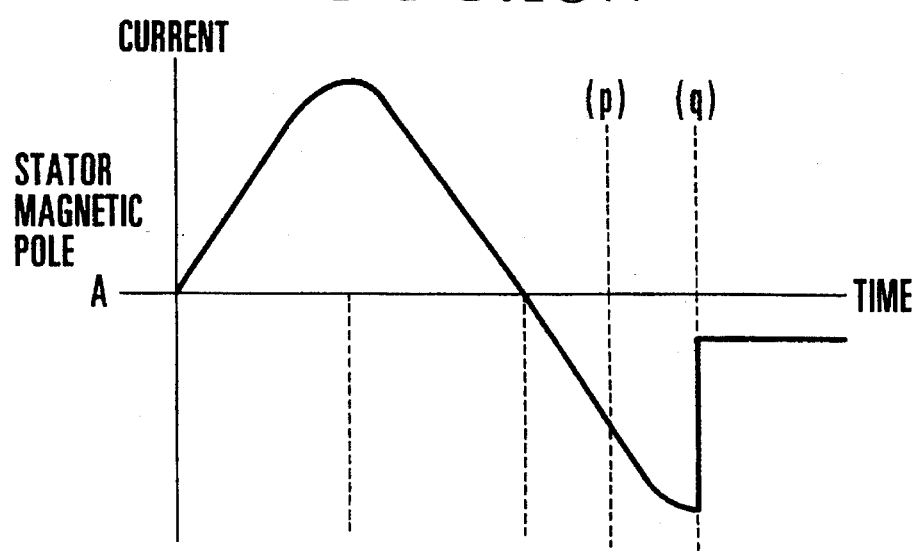
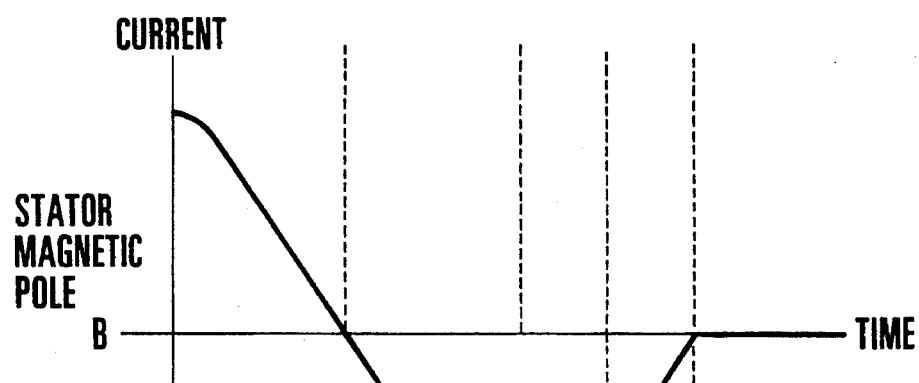
FIG. 10B
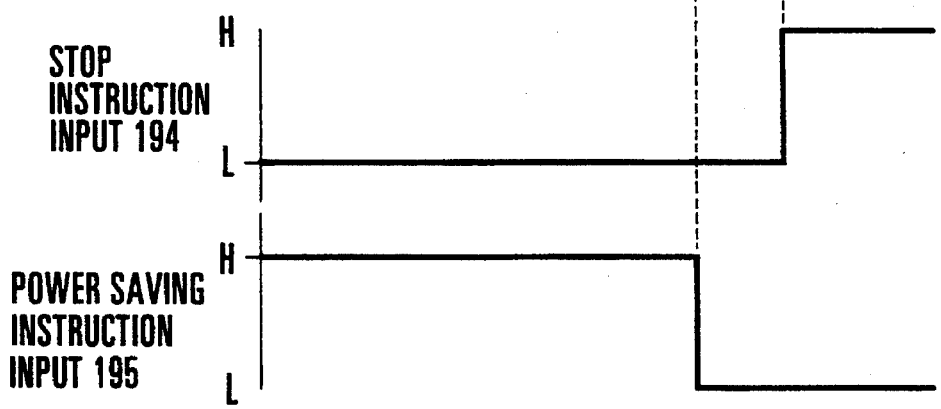

FIG.12A
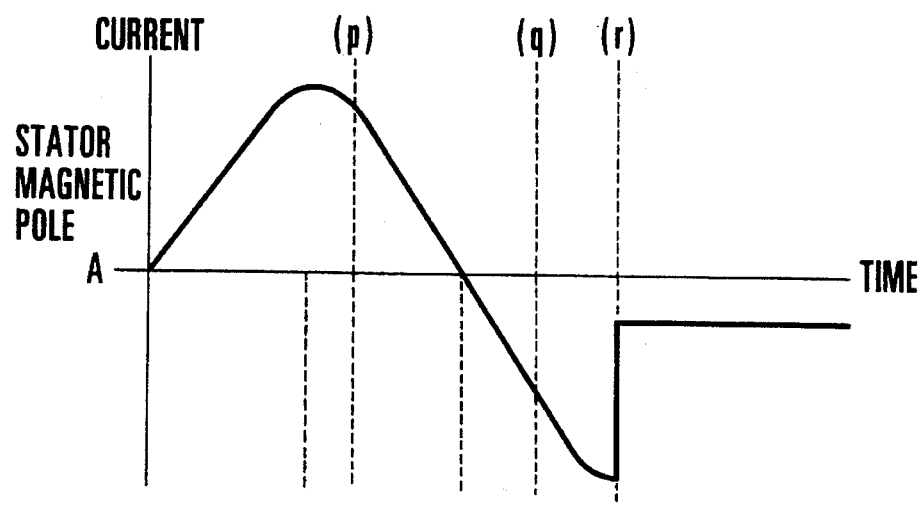
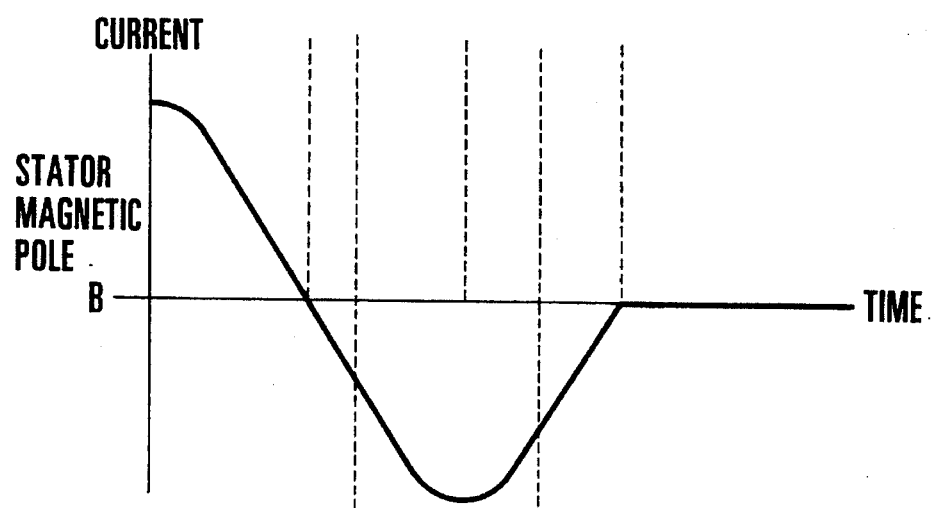
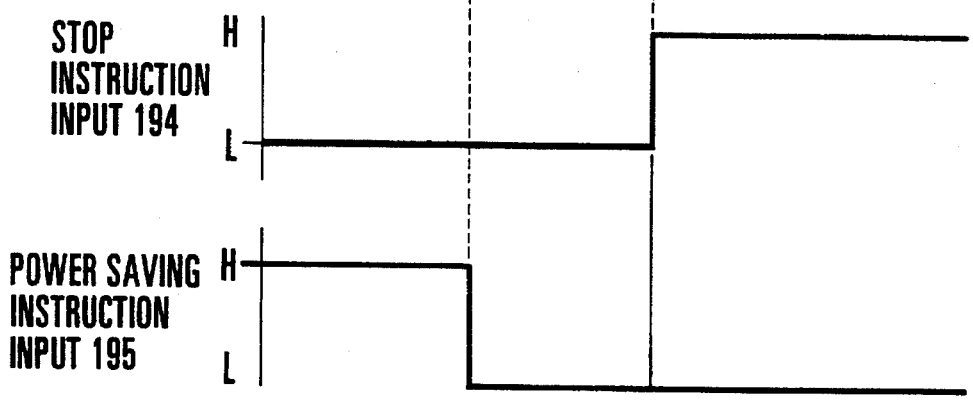
FIG. 12B

FIG.14(a)

| | 1 | 2 | 3 | 4 |
|---|---|---|---|---|
| A | S | O | N | O |
| Ā | N | O | S | O |
| B | O | S | O | N |
| B̄ | O | N | O | S |

FIG.14(b)

| | 1 | 2 | 3 | 4 |
|---|---|---|---|---|
| A | N | S | S | N |
| Ā | S | N | N | S |
| B | N | N | S | S |
| B̄ | S | S | N | N |

FIG.14(c)

| | 1 | 2 | 3 | 4 | 5 | 6 | 7 | 8 |
|---|---|---|---|---|---|---|---|---|
| A | N | N | O | S | S | S | O | N |
| Ā | S | S | O | N | N | S | O | S |
| B | O | N | N | N | O | S | S | S |
| B̄ | O | S | S | S | O | N | N | N |

FIG.15(a)   FIG.15(b)   FIG.15(c)
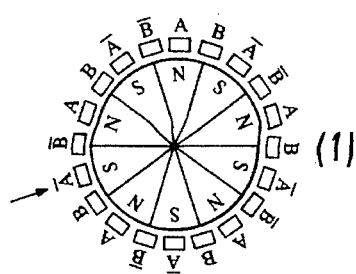 (1) 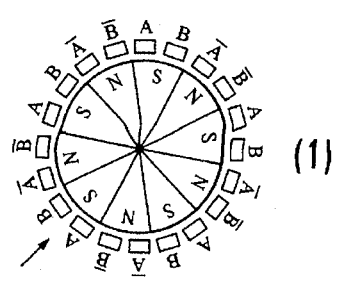 (1) 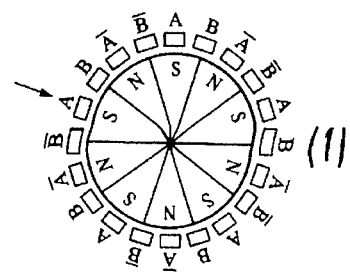 (1)
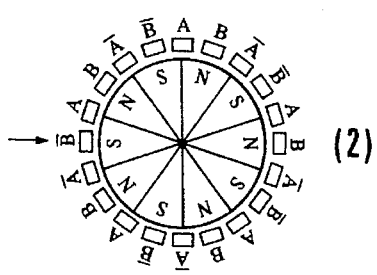 (2) 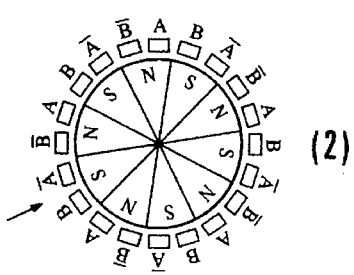 (2) 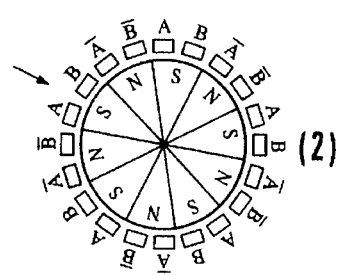 (2)
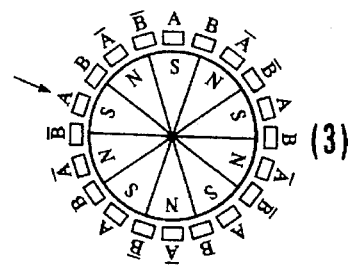 (3) 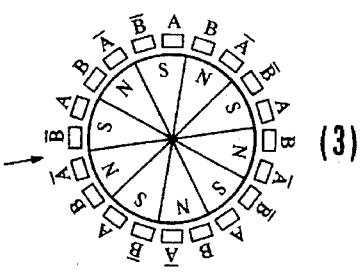 (3) 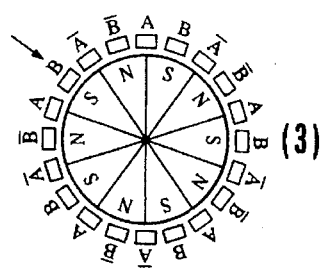 (3)
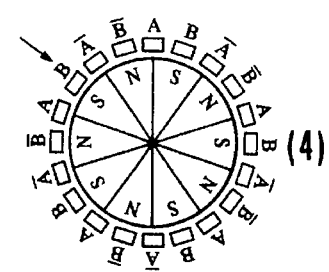 (4) 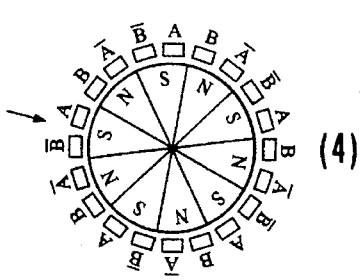 (4) 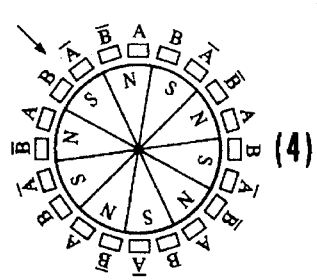 (4)

FIG.24

| Fno. | NUMBER OF STEP PULSES INTO WHICH FIELD OF DEPTH IS CONVERTED |
|---|---|
| 1.85 | ± 1 |
| 2.0 | ± 1 |
| 2.5 | ± 1.25 |
| 2.8 | ± 1.25 |
| 2.87 | ± 1.5 |
| 4.0 | ± 2 |
| 5.6 | ± 2.75 |
| 8.0 | ± 4 |
| 11.0 | ± 5.5 |
| 16.0 | ± 7.75 |
| 22.0 | ± 10.75 |
| 32.0 | ± 16 |

LENS CONTROLLING APPARATUS

BACKGROUND OF THE INVENTION

1. Field of the Invention

The present invention relates to a lens controlling apparatus suitable for use in a still camera, a video camera or the like.

2. Description of the Related Art

It has heretofore been known that stepping motors are employed in many precision machines which require highly accurate position control.

Stepping motors are also employed in, for example, video cameras for the purpose of lens control. This is primarily because such a stepping motor can achieve a high positioning accuracy and can be controlled easily and at high speed because of its open-loop control.

FIG. 1 shows the arrangement and operation of a stepping motor. Referring to FIG. 1, the central magnetic poles constitute a rotor, while the peripheral magnetic poles constitute a stator. Each of the magnetic poles of the rotor is formed by a permanent magnet, while each of the magnetic poles of the stator is formed by the magnetization of the stator by the current supplied to the stepping motor.

In the stepping motor shown in FIG. 1, if the polarity of the stator is varied in the order of from (a) to (d), the rotor moves as indicated by the respective arrows:

(a) Magnetic poles A and −A become a south pole and a north pole, respectively, and magnetic poles B and −B have no polarities;

(b) The magnetic poles A and −A have no polarities, and the magnetic poles B and −B become a south pole and a north pole, respectively;

(c) The magnetic poles A and −A become a north pole and a south pole, respectively, and the magnetic poles B and −B have no polarities; and (d) The magnetic poles A and −A have no polarities, and the magnetic poles B and −B become a north pole and a south pole, respectively.

As can be seen from FIG. 1, to rotate the stepping motor, it is only necessary to vary the polarity of the stator in the above-described manner.

In some existing stator motor driving apparatus, to cope with the problem of noise or the like, the stator is magnetized by using a sinusoidal, driving current waveform such as shown in FIG. 2. In the current waveform shown in FIG. 2, the positions indicated at (a) to (d) respectively correspond to the positions indicated by the arrows in FIG. 1.

In the case where the stator is magnetized by using the driving current waveform shown in FIG. 2, if the stepping motor stops at a phase position other than the phases indicated by the respective arrows in FIG. 1, the relationship between the magnetic poles of the stator and those of the rotor becomes imperfect and the rotor becomes extremely unstable. As a result, the rotor moves by a particular magnetic pole of the rotor being attracted by either one of two adjacent magnetic poles of the stator opposite to the particular magnetic pole. For this reason, in the case of the driving current waveform shown in FIG. 2, the stepping motor must not be stopped at any phase position other than predetermined phases (the positions indicated by the respective arrows in FIG. 1, i.e., the positions indicated at (a) to (d) in FIG. 1).

After the stepping motor has been stopped, to hold the stepping motor at that stop position, it is necessary to continue to supply current having a phase identical to the phase of the driving current waveform supplied to the stepping motor immediately before the stop of the stepping motor. The magnitude of the current may be far smaller than that of the driving current supplied during the driving of the stepping motor.

FIG. 3 diagrammatically shows one example of the stepping motor driving apparatus, and FIG. 4 shows in detail the output current waveform of the driving apparatus of FIG. 3 which corresponds to either one phase.

The driving apparatus shown in FIG. 3 includes a control device 50 for performing control of the apparatus in which a stepping motor 52 is disposed, the control device 50 being formed by a microcomputer, and a motor driving device 51 for driving the stepping motor 52 on the basis of a control signal supplied from the control device 50, as well as the stepping motor 52. The internal arrangement of the motor driving device 51 will be described below. Input/output lines 501 to 505 are disposed between the control device 50 and the motor driving device 51. The line 501 is a clock input line for inputting a clock signal to the motor driving device 51, the line 502 is a driving-direction input line for inputting a driving-direction signal to the motor driving device 51, the line 503 is a monitor output line for outputting a signal indicating that the phase of the motor driving circuit 14 is a predetermined phase, the line 504 is a stop instruction input line for inputting a stop instruction to the motor driving device 51, and the line 505 is a power saving instruction input line for inputting a power saving instruction to decrease the amount of current to be supplied to the stepping motor 52.

The motor driving device 51 includes a counter 511 for counting the number of clocks which are supplied from the control device 50 via the clock input line 501, a current waveform forming circuit 512 for forming a current waveform in accordance with a count value provided by the counter 511, a switch 513 disposed between the clock input line 501 and the counter 511 and operated via the stop instruction input line 504, a constant current source 514 for supplying a constant current to the stepping motor 52 during a power saving operation, and a switch 515 for selecting current to be supplied to the stepping motor 52 by performing switching between the output of the current waveform forming circuit 512 and the output of the constant current source 514. The switch 515 is operated via the power saving instruction input line 505.

Clocks supplied via the clock input line 501 are counted by the counter 511 included in the motor driving device 51, and a current value which is set by the current waveform forming circuit 512 advances step by step in accordance with the count value of the counter 511, thereby forming a motor driving current waveform. A logic level supplied via the driving-direction input line 192 determines whether the stepping motor 52 is to be driven in the forward or backward direction.

Each time the current waveform reaches a predetermined phase, a low-level (L) signal is outputted to the monitor output line 503 as shown in FIG. 4. If the stop instruction input line 504 goes to a high level (H), the switch 513 is opened to disconnect the clock input line 501 and the counter 511 from each other. Accordingly, even if a clock is inputted, the counting of the counter 511 does not advance any more so that the stepping motor 52 stops. If the level of the power saving instruction input line 505 is "H", the output of the current waveform forming circuit 512 is connected to the stepping motor 52, while if the level of the power saving instruction input line 512 is "L", the output of the constant current source 514 is connected to the stepping motor 52.

The control device 50 controls the motor driving device 51 in the following manner:

(1) When the stepping motor 52 is to be driven, the control device 50 sets a direction in which to drive stepping motor 52 via the driving-direction input line 502. Then, the control device 50 inputs a clock signal to the clock input line 501 and causes the current waveform forming circuit 512 to output a motor driving current waveform, thereby driving the stepping motor 52.

(2) When the stepping motor 52 is to be stopped, after the control device 50 confirms through the monitor output line 503 that the stepping motor 52 is positioned at any one of the predetermined phases, the control device 50 sets the level of the stop instruction input line 504 to "H".

(3) When the direction of driving of the stepping motor 52 is to be changed, the control device 50 temporarily stops the stepping motor 52 in the manner stated above in the paragraph (2), and inverts the level of the driving-direction input line 502. Then, the control device 50 sets the level of the stop instruction input line 504 to "L" and causes the current waveform forming circuit 512 to output the motor driving current waveform, thereby driving the stepping motor 52.

(4) If the stopped state of the stepping motor 52 is to be continued, the control device 50 sets the level of the power saving instruction input line 505 to "L" to decrease current consumption, and switches over the switch 515 to select the output of the constant current source 514 as current to be supplied to the stepping motor 52, thereby decreasing power consumption.

If the above-described stepping motor driving apparatus is applied to the control of a zooming lens and a focusing lens in a video camera, the control device 50 operates in the following manner. In operation, to identify the mechanical position of the zooming lens or the focusing lens, the control device 50 calculates an address each time the stepping motor 52 reaches one of the predetermined phases, and the motor driving device 51 outputs the low-level signal "L" to the monitor output line 503 when the stepping motor 52 reaches one of the predetermined phases. Specifically, each time the control device 50 detects that the low-level signal "L" is outputted to the monitor output line 503, the control device 50 increases or decreases the value of an address according to the direction of driving of the stepping motor 52, thereby identifying the respective positions of the zooming lens and the focusing lens. Thus, the control device 50 performs lens control during an autofocus or zooming operation on the basis of such an address.

However, the above-described motor driving apparatus having the above-described arrangement has the following problem.

For example, when the control device is to stop the lens, if the stepping motor is not positioned at any of the predetermined phases, the control device fails to output a stop instruction, and must output the stop instruction after the stepping motor reaches any one of the predetermined phases.

In a video camera or the like which uses the control device, not only does the control device drive the lenses, but also performs many other functions. Accordingly, it is a substantial burden on the control device to oversee the timing of outputting a stop instruction.

If the rotor of the stepping motor fails to stop at a predetermined phase and stops at a halfway phase position relative to the magnetic poles of the stator, the rotor becomes extremely unstable and moves by a particular magnetic pole of the rotor being attracted by either one of two adjacent magnetic poles of the stator opposite to the particular magnetic pole. If the rotor moves, a discrepancy occurs between an actual position of the lens and an address calculated by the control device, thereby impeding an autofocus or zooming operation.

Similarly, the power saving instruction must not be executed except when the relative position between the magnetic poles of the rotor and the magnetic poles of the stator corresponds to the predetermined phase. Accordingly, in this case as well, a phase deviation occurring between the magnetic poles of the rotor and the magnetic poles of the stator becomes a serious problem in terms of control.

SUMMARY OF THE INVENTION

A first object of the present invention which has been made to solve the above-described problems is to provide an efficient and stable, lens controlling apparatus.

To achieve the above object, in accordance with one aspect of the present invention, there is provided a lens controlling apparatus which comprises a stepping motor for driving a lens, a driving current forming circuit for forming a driving current waveform to be supplied to the stepping motor, an inputting circuit for inputting a stop instruction to stop the stepping motor, a stopping circuit for executing a stopping operation of the stepping motor in accordance with the stop instruction, a phase detecting circuit for detecting a phase of the driving current waveform to be supplied to the stepping motor, and an inhibiting circuit for inhibiting the stopping operation from being executed except when the phase of the driving current waveform detected by the phase detecting circuit is a predetermined phase.

A second object of the present invention is to provide an automatic focus adjusting apparatus capable of performing rapid, highly accurate and efficient control at all times.

To achieve the above object, in accordance with another aspect of the present invention, there is provided a lens controlling apparatus which comprises a focusing lens, a stepping motor for driving the focusing lens, a driving current forming circuit for forming a driving current waveform to be supplied to the stepping motor, an inputting circuit for inputting a stop instruction to stop the stepping motor, a stopping circuit for executing a stopping operation of the stepping motor in accordance with the stop instruction, a phase detecting circuit for detecting a phase of the driving current waveform to be supplied to the stepping motor, and an inhibiting circuit for inhibiting the stopping operation from being executed except when the phase of the driving current waveform detected by the phase detecting circuit is a predetermined phase.

A third object of the present invention is to provide a motor driving apparatus suitable for use in a lens controlling apparatus of a still camera or a video camera To achieve the above object, in accordance with another aspect of the present invention, there is provided a motor controlling apparatus as well as a lens controlling apparatus using the motor controlling apparatus. The motor controlling apparatus comprises a motor, means for forming a driving current waveform to be supplied to the motor, means for inputting an instruction to execute a predetermined operation, means for executing the predetermined operation according to the instruction, phase detecting means for detecting a phase of the driving current waveform, and inhibiting means for inhibiting the predetermined operation from being executed except when the phase of the driving current waveform detected by the phase detecting means is a predetermined phase.

To achieve the above object, in accordance with another aspect of the present invention, there is provided a motor controlling apparatus as well as a lens controlling apparatus using the motor controlling apparatus. The motor controlling apparatus comprises a stepping motor, means for forming a motor driving current waveform to be supplied to the stepping motor, means for inputting a stop instruction to stop the stepping motor, means for stopping the stepping motor in accordance with the stop instruction, phase detecting means for detecting a phase of the motor driving current waveform, and inhibiting means for inhibiting the stop instruction from being executed except when the phase of the motor driving current waveform detected by the phase detecting means is a predetermined phase.

To achieve the above object, in accordance with another aspect of the present invention, there is provided a motor controlling apparatus as well as a lens controlling apparatus using the motor controlling apparatus. The motor controlling apparatus comprises a motor, means for forming a driving current waveform to be supplied to the motor, means for inputting an instruction to decrease a supply of current to the motor, means for decreasing the supply of current to the motor in accordance with the instruction, detecting means for detecting a phase of the driving current waveform, and inhibiting means for inhibiting the instruction from being executed except when the phase of the driving current waveform detected by the detecting means is a predetermined phase.

To achieve the above object, in accordance with another aspect of the present invention, there is provided a motor controlling apparatus as well as a lens controlling apparatus using the motor controlling apparatus. The motor controlling apparatus comprises means for forming a driving current waveform to be supplied to a motor, means for inputting a stop instruction to stop the motor, means for stopping the motor in accordance with the stop instruction, means for inputting an instruction to decrease a supply of current to the motor, means for decreasing the supply of current to the motor in accordance with the instruction to decrease the supply of current to the motor, detecting means for detecting a phase of the driving current waveform, and inhibiting means for inhibiting the instruction to decrease the supply of current to the motor from being executed except when the phase of the driving current waveform detected by the detecting means is a predetermined phase and the stop instruction is inputted.

Another object of the present invention is to provide a motor driving apparatus capable of improving the efficiency of a control system and stabilizing motor control, as well as a lens controlling apparatus using the motor driving apparatus. Even if an instruction to execute predetermined control of a motor is inputted to the motor driving apparatus, the motor driving apparatus does not execute the instruction and holds it, except when the phase of a driving current waveform to be supplied to the motor is a predetermined phase, and at a time when a predetermined phase relationship is satisfied, the motor driving apparatus can automatically execute processing according to the instruction.

Another object of the present invention is to provide a lens controlling apparatus capable of improving the efficiency of a control system and stabilizing the stopped state of a motor, as well as a motor driving apparatus using the lens controlling apparatus, which is suitable for use in a still camera or a video camera. Even if a stop instruction is inputted to the motor, the lens controlling apparatus does not stop the motor and holds the stop instruction, except when the phase of a driving current waveform to be supplied to the motor is a predetermined phase, and at a time when a predetermined phase relationship is satisfied, the lens controlling apparatus can automatically execute processing according to the stop instruction.

Another object of the present invention is to provide a lens controlling apparatus capable of making motor driving reliable and stable as well as a still camera and a video camera which uses the lens controlling apparatus. Even if an instruction to decrease a supply of current to the motor is inputted, the lens controlling apparatus inhibits execution of the instruction until a driving current waveform to be supplied to the motor satisfies a predetermined phase relationship.

The above and other objects, features and advantages of the present invention will become apparent from the following detailed description of preferred embodiments of the present invention, taken in conjunction with the accompanying drawings.

BRIEF DESCRIPTION OF THE DRAWINGS

FIGS. 1A–1D are a schematic view aiding in describing the operation of a stepping motor;

FIG. 7 is a block diagram of a motor controlling apparatus according to a first embodiment of the present invention;

FIGS. 8A and B are a view aiding in describing the operation of the first embodiment shown in FIG. 7;

FIG. 9 is a block diagram of a motor controlling apparatus according to a second embodiment of the present invention;

FIGS. 10A and B are a view aiding in describing the operation of the second embodiment shown in FIG. 9;

FIGS. 12A and B are a view aiding in describing the operation of the third embodiment shown in FIG. 11;

FIGS. 14(a), 14(b) and 14(c) are views each of which shows the relationship between the polarity of each magnetic pole of a stepping motor and a corresponding driving current waveform;

FIGS. 15(a), 15(b) and 15(c) are views each of which shows the positional-relationship between a rotor and a stator corresponding to the relationship between the polarity of each magnetic pole and the corresponding driving current waveform shown in each of FIGS. 14(a), 14(b) and 14(c);

FIG. 24 is a view aiding in describing the operation of the stepping motor driving controlling circuit according to the fifth embodiment of the present invention, and shows a data table on which a depth of field is converted into the number of step pulses.

DETAILED DESCRIPTION OF THE PREFERRED EMBODIMENTS

Preferred embodiments of the present invention will be described below in detail with reference to the accompany drawings.

(First Embodiment)

A motor driving apparatus according to a first embodiment of the present invention will be described below in detail with reference to FIGS. 5 to 8.

Figure 5:
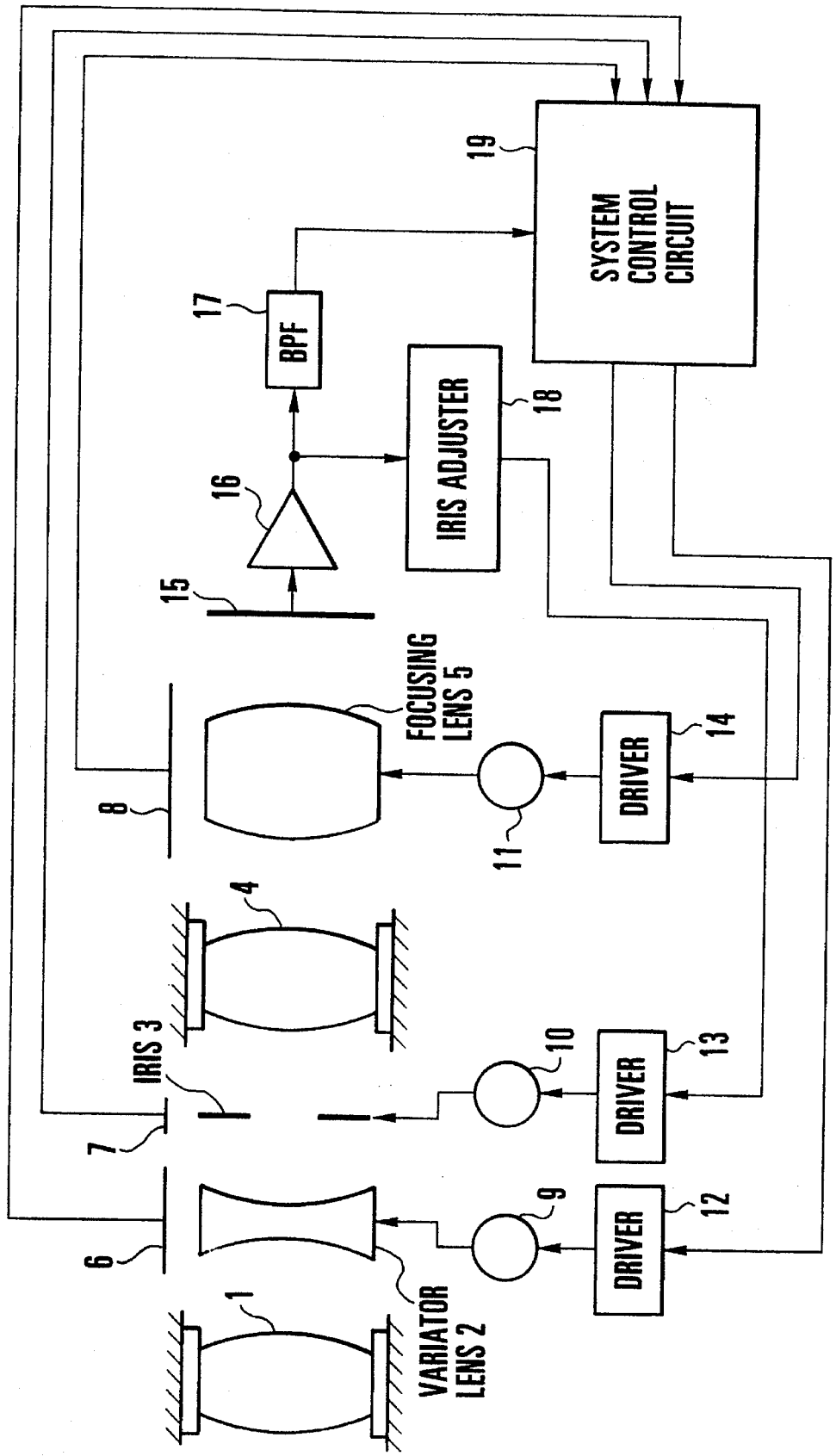
FIG. 5 is a schematic block diagram of the arrangement of a video camera in which each embodiment of the present invention is practised.

FIG. 5 is a block diagram showing an arrangement in which a motor driving apparatus according to the first embodiment of the present invention is applied to an autofocus part, i.e., a focusing lens driving part, of a video camera system. Incidentally, a rear-focus type of lens optical system is employed in the arrangement shown in FIG. 5.

The arrangement shown in FIG. 5 includes a first lens group (front lens) 1 which is fixedly disposed, a second lens group (variator lens or zooming lens) 2 for effecting magnification variation, an iris 3, a third lens group 4 which is fixedly disposed, a fourth lens group (focusing lens) 5 provided with both a focusing function and a compensation function for correcting a movement of a focal plane due to a magnification variation.

The arrangement shown in FIG. 5 also includes position encoders 6, 7 and 8 for respectively detecting the mechanical positions of the zooming lens 2, the iris 3 and the focusing lens 5, converting the respective detected mechanical positions into corresponding electrical signals and supplying the corresponding electrical signals to a system control circuit 19 which will be described later.

The arrangement shown in FIG. 5 also includes actuators 9, 10 and 11 for respectively causing the zooming lens 2, the iris 3 and the focusing lens 5 to move in the direction of the optical axis.

Drivers 12, 13 and 14 respectively drive the actuators 9, 10 and 11 in accordance with signals supplied from the system control circuit 19 for controlling the entire video camera system as will be described later.

The shown arrangement also includes an image pickup device 15 such as a CCD. FIG. 5 representatively shows only the position of the image pickup plane of the image pickup device 15. The arrangement also includes an amplifier 16 for amplifying an image pickup signal outputted from the image pickup device 15 up to a predetermined level, a band-pass filter 17 for extracting a predetermined high-frequency component for use in focus detection from the image pickup signal outputted from the image pickup device 15 and amplified by the amplifier 16, an iris adjuster 18 for controlling the state of opening of the iris 3 by driving the driver 13 and the actuator 10 so that the level of the image pickup signal outputted from the image pickup device 15 is made constant at a predetermined level, and the system control circuit 19 for globally controlling the entire video camera system. The system control circuit 19 is formed by a microcomputer.

In the video camera system which is arranged in the manner shown in FIG. 5, the system control circuit 19 drives and controls the driver 14 so that the output signal level of the band-pass filter 17 becomes a maximum value, thereby moving the focusing lens 5 to effect automatic focus adjustment (AF). During this time, the system control circuit 19 finds a depth of field by making reference to aperture value information and the like supplied from the position encoder 7 associated with the iris 3, and controls the focusing lens 5 so that the operating characteristics thereof, such as driving speed and response speed, become optimal.

Simultaneously, the system control circuit 19 controls the movement of the zooming lens 2 for the purpose of magnification variation and the movement of the focusing lens 5 for the purpose of correcting the movement of the focal plane due to the magnification variation, on the basis of stored information indicative of the in-focus loci of the focusing lens 5. Thus, the system control circuit 19 performs a magnification varying operation without causing defocusing. The control using the in-focus loci will be described later in greater detail in connection with a fourth embodiment.

Figure 6:
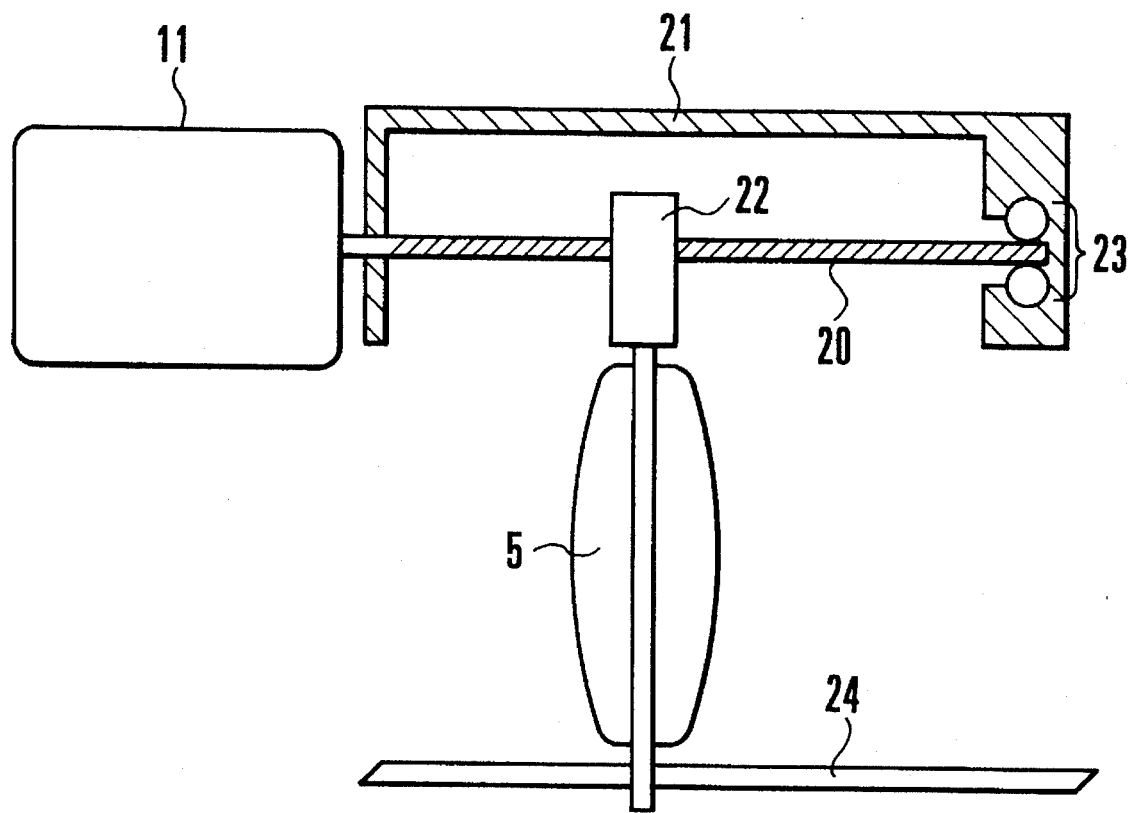
FIG. 6 is a schematic block diagram showing the structure of a focusing lens driving system.

FIG. 6 shows in detail the arrangement of a lens driving system. Since a zooming lens driving system and a focusing lens driving system can be arranged as a similar lens driving system, only the focusing lens driving system is shown in FIG. 6.

The focusing lens driving system shown in FIG. 6 includes a stepping motor 11 which serves as an actuator for driving the focusing lens 5, a leadscrew 20 which serves also as the output rotating shaft of the stepping motor 11, a support member 21 for supporting the output rotating shaft 20, a rack 22 meshed with the output rotating shaft 20 in such a manner as to be movable in the axial direction with the rotation of the output rotating shaft 20, and a bearing 23 for the output rotating shaft 20.

The focusing lens 5 is fixed to the rack 22 at one end and engaged with a guide rod 24 at the other end. The guide rod 24 is disposed to extend in parallel with the output rotating shaft 20, and the focusing lens 5 is arranged to move in parallel with the optical axis by being guided by the guide rod 24.

Accordingly, as the output rotating shaft 20 is rotated by the stepping motor 11, the rack 22 moves in parallel with the optical axis and the focusing lens 5 fixed to the rack 22 is made to move.

The arrangement and operation of a control device for the stepping motor 11 for driving the focusing lens 5 in the first embodiment of the present invention will be described below in sequence.

The structure of the stepping motor 11 is as shown in FIG. 7 and, as described previously, the driving current waveforms shown in FIG. 8 are applied to the stepping motor 11 for the purpose of reducing noise. Further, as described previously, after the stepping motor 11 has stopped, a holding current having a phase identical to the phase of the driving current supplied immediately before the stop of the stepping motor 11 is supplied thereto in order to hold the rotational position of the stepping motor 11. As described previously, the holding current may be smaller than the driving current required for driving the stepping motor.

FIG. 7 shows the internal arrangement of the driver or motor driving circuit 14 as well as the connection relationships between the system control circuit 19, the driver 14 and the stepping motor 11. A primary feature of the present invention resides in the contents of the driver 14.

First of all, the internal arrangement of the motor driving circuit 14 will be described with reference to FIG. 7. Input/output lines 191 to 195 are disposed between the system control circuit 19 and the motor driving circuit 14. The line 191 is a clock input line for inputting a clock to the motor driving circuit 14, the line 192 is a driving-direction input line for inputting a driving-direction signal to the motor driving circuit 14, the line 193 is a monitor output line for outputting a signal indicating that the phase of the motor driving circuit 14 is a predetermined phase, the line 194 is a stop instruction input line for inputting a stop instruction to the motor driving circuit 14, and the line 195 is a power saving instruction input line for inputting an instruction to decrease the amount of current to be supplied to the coils of the stepping motor 11.

The motor driving circuit 14 includes a counter 141 for counting the number of clocks which are supplied from the system control circuit 19 via the clock input line 191, a current waveform forming circuit 142 for forming a current waveform in accordance with a count value provided by the counter 141, a switch 143 disposed between the clock input line 191 and the counter 141 and operated via the stop instruction input line 194, a constant current source 144 for supplying a constant current to the stepping motor 11 during a power saving operation, and a switch 145 for selecting current to be supplied to the stepping motor 11 by performing switching between the output of the current waveform forming circuit 142 and the output of the constant current source 144. The switch 145 is operated via the power saving instruction input line 195.

Clock signals supplied via the clock input line 191 are counted by the counter 141 included in the motor driving circuit 14, and a current value which is set by the current waveform forming circuit 142 advances step by step in accordance with the count value in the manner described previously with reference to FIG. 4, thereby forming a motor driving current waveform. A logic level supplied via the driving-direction input line 192 determines whether the stepping motor 11 is to be driven in the forward or backward direction.

Figure 2A:
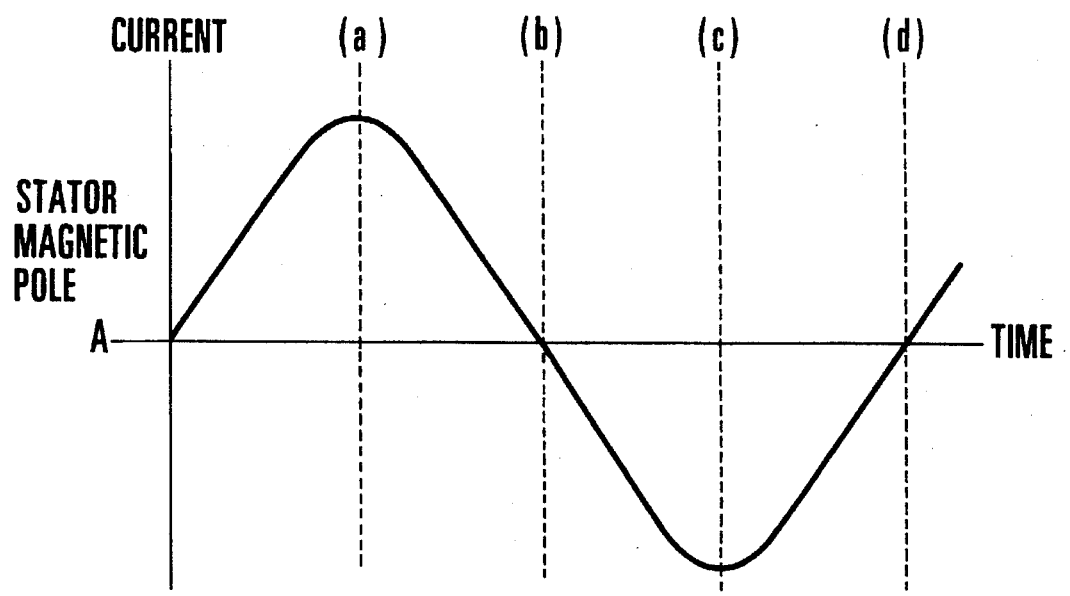
FIGS. 2A and B are a view aiding in describing the operation of the stepping motor shown in FIG. 1.
Figure 2B:
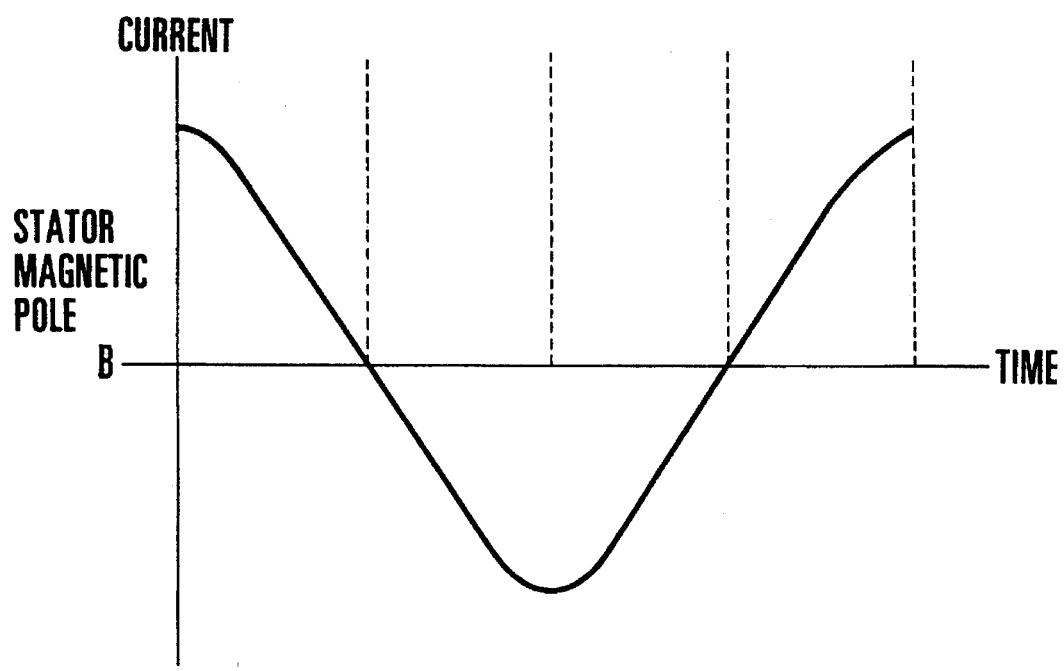
Figure 3:
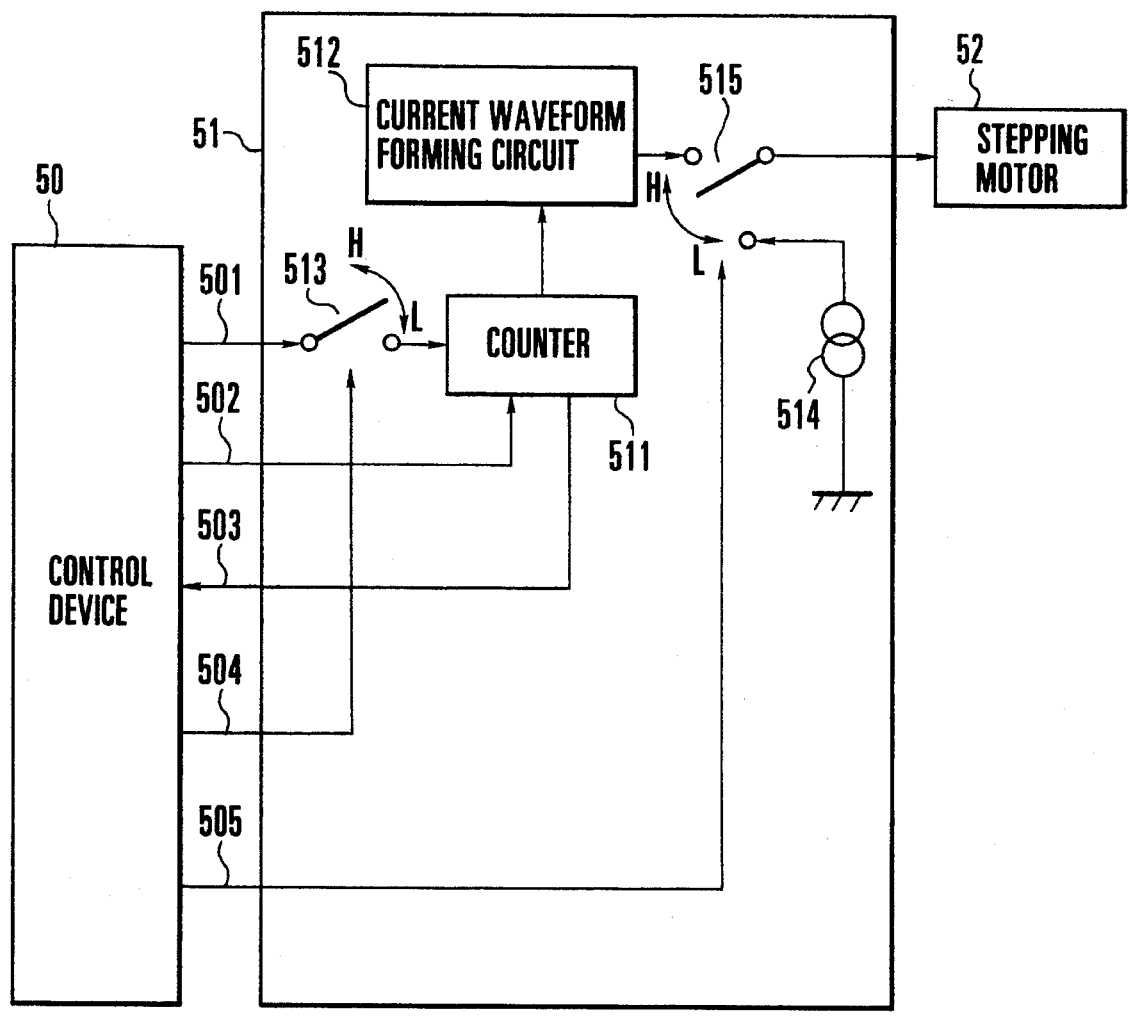
FIG. 3 is a block diagram showing one example of a stepping motor driving circuit.
Figure 4:
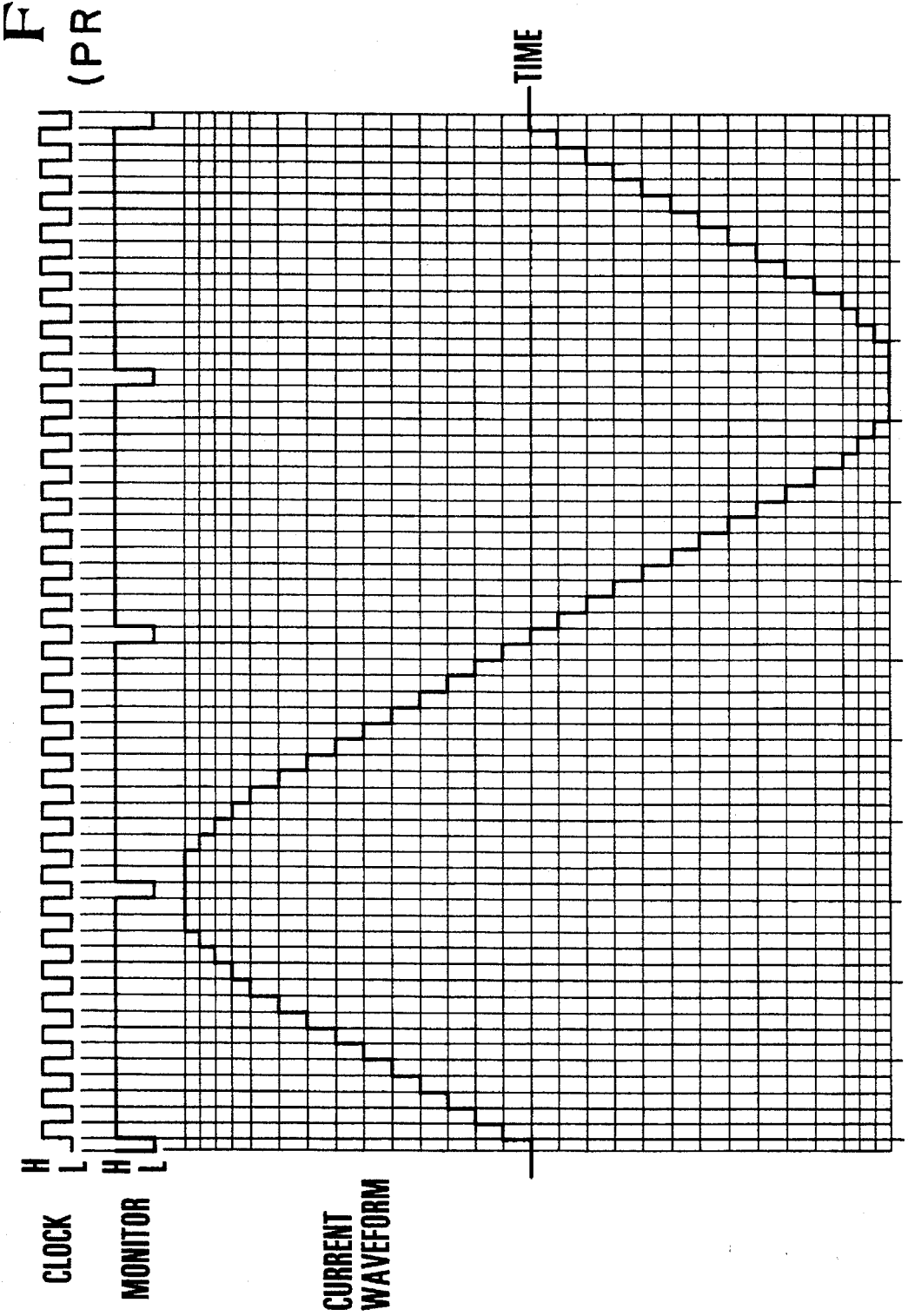
FIG. 4 is a waveform diagram showing a current waveform for sinusoidal wave driving as well as the timing of clock signals and monitor outputs.

Each time the motor driving current waveform reaches one of the predetermined phases, a low-level signal "L" is outputted to the monitor output line 193 as shown in FIG. 4.

The motor driving circuit 14 also includes an AND circuit 146 for performing the logical AND between an input supplied via the stop instruction input line 194 and the negation of an output supplied via the monitor output line 193, and the AND circuit 146 provides an output 147. If the output 147 of the AND circuit 146 is a high-level signal "H", the switch 143 is opened to disconnect the clock input line 191 and the counter 141 from each other. Accordingly, even if a clock signal is inputted, the counting of the counter 141 does not advance any more so that the stepping motor 11 stops.

If the level of the power saving instruction input line 195 is "H", the switch 145 connects the output of the current waveform forming circuit 142 to the stepping motor 11, while if the level of the power saving instruction input line 195 is "L", the switch 145 connects the output of the constant current source 144 to the stepping motor 11.

According to the above-described arrangement, even if the stepping motor 11 is not positioned at any of the predetermined phases at which the stepping motor 11 can stop, the system control circuit 19 sets the level of the stop instruction input line 194 to "H" and can perform other processing. In other words, the motor driving circuit 14 can automatically stop the stepping motor 11 at a desired one of the predetermined phases.

The above-described operation will be further described with reference to FIG. 7. The logical relationships between the stop instruction input line 194, the monitor output line 193 and the output 147 of the AND circuit 146 are as shown in FIG. 7. As is apparent from FIG. 7, only when the level of the stop instruction input line 194 is "H" and the level of the monitor output line 193 is "L" (a stop instruction is inputted from the system control circuit 19 and the stepping motor 11 is positioned at any one of the predetermined phases), the switch 143 is turned off. The clock input line 191 and the counter 141 are disconnected from each other and the counting of the counter 141 stops. The current waveform forming circuit 142 continues to output a constant current, and the stepping motor 11 stops.

The above-described operation will be described with reference to the current waveform diagram of FIG. 8. At a time instant (p) of FIG. 8, the system control circuit 19 sets the level of the stop instruction input line 194 to "H", but the motor driving circuit 14 does not stop the stepping motor 11 because the low-level signal "L" indicating that the stepping motor 11 has reached any one of the predetermined phases at which the stepping motor 11 can stop is not outputted from the counter 141 to the monitor output line 193.

If the stepping motor 11 reaches any one of the predetermined phases at which the stepping motor 11 can stop at a time instant (q), the low-level signal "L" is outputted from the counter 141 to the monitor output line 193, and the output 147 of the AND circuit 146 is set to "H" and the switch 143 is opened, so that the motor driving circuit 14 automatically makes the current waveform constant and stops the stepping motor 11.

Therefore, according to the first embodiment of the present invention, at the time instant when the system control circuit 19 outputs the high-level signal "H" to the stop instruction input line 194 in order to stop the stepping motor 11, if the stepping motor 11 has not yet reached any of the predetermined phases at which the stepping motor 11 can stop, the system control circuit 19 does not stop the stepping motor 11. Then, if the stepping motor 11 reaches any one of the predetermined phases at which the stepping motor 11 can stop, the system control circuit 19 stops the stepping motor 11 at the time instant when the low-level signal "L" is outputted to the monitor output line 193. At the time instant when the stopping manipulation is performed by the operator, the system control circuit 19 can output the high-level signal "H" to the stop instruction input line 194. In this state, the system control circuit 19 can perform another processing until the low-level signal "L" is outputted to the monitor output line 193. Accordingly, the wait time of the system control circuit 19 can be reduced so that efficient control becomes possible.

In other words, it is possible to solve the problem that if the stepping motor 11 is positioned at any one of the predetermined phases when the system control circuit 19 is to stop the focusing lens 5, the system control circuit 19 cannot output a stop instruction and must output the stop instruction after the stepping motor 11 reaches any one of the predetermined phases.

Furthermore, since the system control circuit 19 itself does not need to oversee the timing of outputting a stop instruction, extra processing for timing or interrupt control is not needed, so that it is possible to reduce the load on the control of the system control circuit 19.

In addition, since the rotor of the stepping motor can be made to stop at all times at any of the predetermined phases at which the stepping motor can stop stably, it is possible to prevent the problem that the magnetic poles of the rotor stop at a halfway phase position relative to the magnetic poles of the stator and the rotor becomes extremely unstable and moves by a particular magnetic pole of the rotor being attracted by either one of two adjacent magnetic poles of the stator opposite to the particular magnetic pole. Accordingly, it is possible to prevent the problem that a discrepancy occurs between an actual position of the lens and an address calculated by the control device.

(Second Embodiment)

FIG. 9 shows a second embodiment of the present invention. In the second embodiment, the motor driving circuit 14 of FIG. 7 is replaced with a motor driving circuit 14', and FIG. 9 shows the internal arrangement of the motor driving circuit 14' as well as the connection relationships between the system control circuit 19, the motor driving circuit 14' and the stepping motor 11.

In FIG. 9, identical reference numerals are used to denote constituent elements identical to those of the first embodiment shown in FIG. 7, and description thereof is omitted.

The arrangement shown in FIG. 9 differs from that shown in FIG. 7 in the following respect: The AND circuit 146 is not disposed between the stop instruction input line 194 extending from the system control circuit 19 and the monitor output line 193 extending from the counter 141, and a NAND circuit 148 is disposed for receiving the negation of an input supplied via the power saving instruction input line 195 and the negation of an output supplied via the monitor output line 193, and the opening and closing of the switch 145 is controlled by an output 149 of the NAND circuit 148.

Even if the stepping motor 11 is not positioned at any of the predetermined phases at which the stepping motor 11 can stably stop, the system control circuit 19 sets the level of the power saving instruction input line 195 to "L" and can subsequently perform another processing.

Specifically, when the level of the power saving instruction input line 195 is "L", at the time instant when the low-level signal "L" indicating that the stepping motor 11 has reached any one of the predetermined phases at which the stepping motor 11 can stably stop is outputted from the counter 141 to the monitor output line 193, the level of the output 149 of the NAND circuit 148 goes to "L" and the switch 145 is opened to connect the constant current source 144 to the stepping motor 11 so that the stepping motor 11 is automatically made to perform a power saving operation at that predetermined phase.

The logical-value table shown in FIG. 9 shows the logical relationships between the power saving instruction input line 195, the monitor output line 193 and the output 149 of the NAND circuit 148. As is apparent from FIG. 9, only when the level of the stop instruction input line 194 is "L" and the level of the monitor output line 193 is "L" (a power saving instruction is inputted from the system control circuit 19 and the stepping motor 11 is positioned at any one of the predetermined phases at which the stepping motor 11 can stably stop), the level of the output 149 of the NAND circuit 148 goes to "L" and the switch 145 is switched over. Thus, the constant current source 144 is connected to the stepping motor 11, and the stepping motor 11 is held at that predetermined phase by the current supplied from the constant current source 144.

The above-described operation will be described with reference to FIG. 10. At a time instant (p) of FIG. 10, the system control circuit 19 sets the level of the power saving instruction input line 195 to "L", but the motor driving circuit 14' does not perform a power saving operation.

At a time instant (q), when the stepping motor 11 reaches any one of the predetermined phases at which the stepping motor 11 can stably stop, the motor driving circuit 14' automatically performs the power saving operation to hold the stepping motor 11 at that predetermined phase.

(Third Embodiment)

Figure 11:
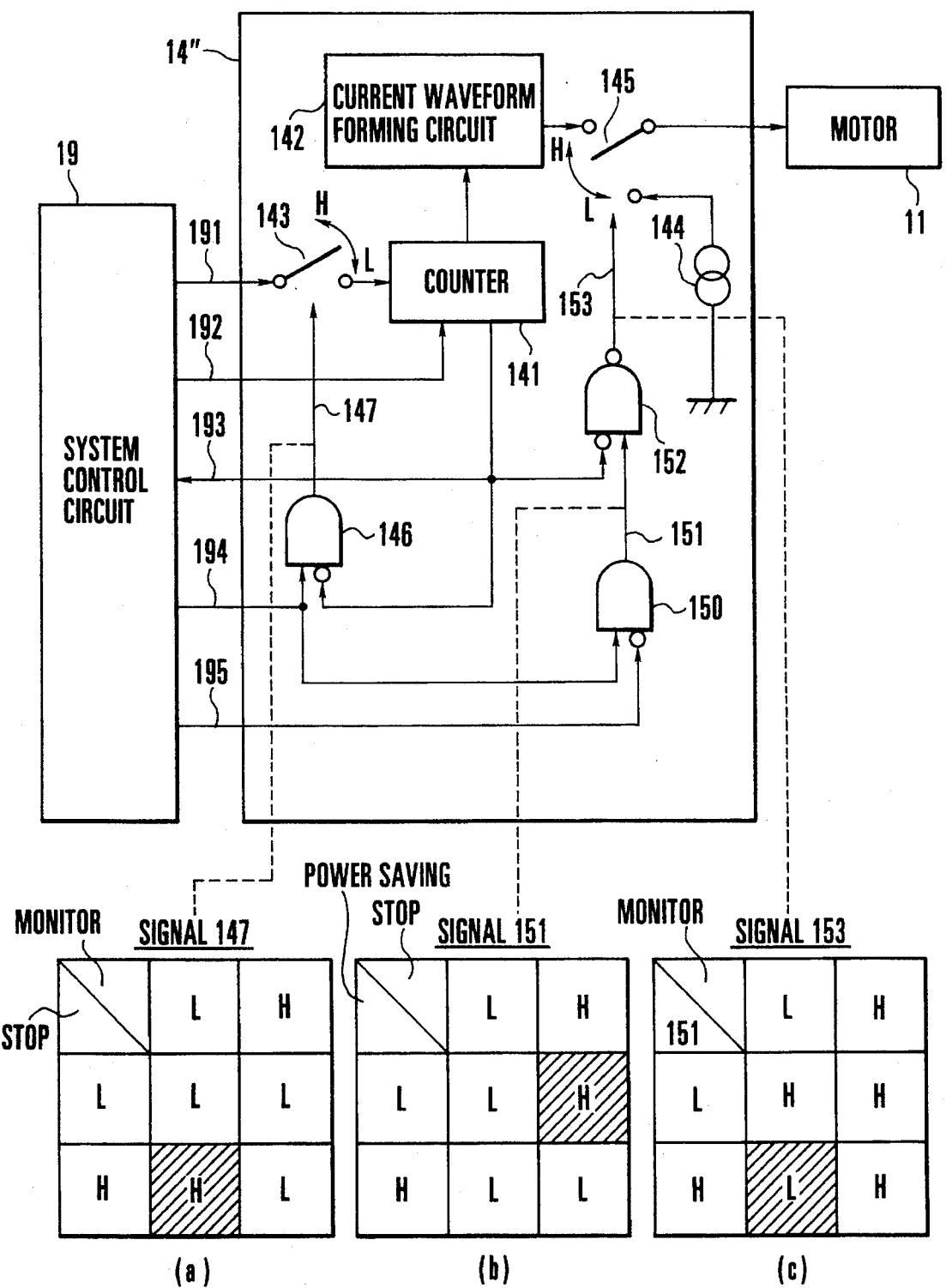
FIG. 11 is a block diagram of a motor controlling apparatus according to a third embodiment of the present invention.

FIG. 11 shows a third embodiment of the present invention. In the third embodiment, the motor driving circuit 14 of FIG. 7 is replaced with a motor driving circuit 14", and FIG. 11 shows the internal arrangement of the motor driving circuit 14" as well as the connection relationships between the system control circuit 19, the motor driving circuit 14" and the stepping motor 11.

In FIG. 11, identical reference numerals are used to denote constituent elements identical to those of the first or second embodiment shown in FIG. 7 or 9, and description thereof is omitted.

The arrangement shown in FIG. 11 is similar to that shown in FIG. 7 in that the AND circuit 146 is provided for performing the logical AND between an input supplied via the stop instruction input line 194 and the inverse of an output supplied via the monitor output line 193 and providing the output 147 for controlling the opening and closing of the switch 143.

The arrangement shown in FIG. 11 also includes an AND circuit 150 for performing the logical AND between the negation of an input supplied via the power saving instruction input line 195 and an input supplied via the stop instruction input line 194, and a NAND circuit 152 for receiving an output 151 of the AND circuit 150 and the negation of the output of the monitor output line 193. The NAND circuit 152 provides an output 153 for controlling the opening and closing of the switch 145.

Even if the stepping motor 11 is not positioned at any of the predetermined phases at which the stepping motor 11 can stably stop, the system control circuit 19 sets the level of the power saving instruction input line 195 to "L" and can subsequently perform another processing.

Further, even if the stepping motor 11 is not positioned at any of the predetermined phases at which the stepping motor 11 can stably stop, the system control circuit 19 sets the level of the stop instruction input line 194 to "H" so that the system control circuit 19 does not need to continue to monitor the state of the monitor output line 193. Accordingly, the system control circuit 19 can subsequently perform another processing.

At the time instant when the low-level signal "L" indicating that the stepping motor 11 has reached any one of the predetermined phases at which the stepping motor 11 can stably stop is outputted from the counter 141 to the monitor output line 193, the motor driving circuit 14" opens the switch 143 by means of the AND circuit 146 to automatically stop the stepping motor 11 at that predetermined phase.

Simultaneously, the motor driving circuit 14" opens the switch 145 via the AND circuit 150 and the NAND circuit 152, thereby causing the stepping motor 11 to perform a power saving operation.

The above-described operation will be described in further detail. A logical-value table (a) of FIG. 11 shows the logical relationships between the stop instruction input line 194, the monitor output line 193 and the output 147 of the AND circuit 146. As is apparent from the logical-value table (a), only when the level of the stop instruction input line 194 is "H" and the level of the monitor output line 193 is "L" (a stop instruction is inputted from the system control circuit 19 and the stepping motor 11 is positioned at any one of the predetermined phases at which the stepping motor 11 can stably stop), the level of the output 147 of the AND circuit 146 goes to "H" and the switch 143 is turned off. Thus, the clock input line 191 and the counter 141 are disconnected from each other and the counter 141 stops counting. The current waveform forming circuit 142 continues to output a constant current and the stepping motor 11 stops.

A logical-value table (b) of FIG. 11 shows the output 151 of the AND circuit 150 which performs the logical AND between an input supplied via the stop instruction input line 194 and the negation of an input supplied via the power saving instruction input line 195. A logical-value table (c) of FIG. 11 shows the output 153 of the NAND circuit 152 which performs the logical AND between the output 151 of the AND circuit 150 and the negation of an output supplied via the monitor output line 193.

As is apparent from the logical-value table (c), only when the level of the stop instruction input line 194 is "H" and the level of the power saving instruction input line 195 is "L" and the level of the monitor output line 193 is "L" (a stop instruction and a power saving instruction are inputted from the system control circuit 19 and the stepping motor 11 is positioned at any one of the predetermined phases at which the stepping motor 11 can stably stop), the level of the output 153 of the NAND circuit 152 goes to "L" and the switch 145 is switched over. Thus, the constant current source 144 is connected to the stepping motor 11, and the stepping motor 11 is held at that predetermined phase by the current supplied from the constant current source 144.

The above-described operation will be described with reference to FIG. 12. At a time instant (p) of FIG. 12, the system control circuit 19 sets the level of the power saving instruction input line 195 to "L", but the motor driving circuit 14" does not perform a power saving operation. At a time instant (q), the system control circuit 19 sets the level of the stop instruction input line 194 to "H", but the motor driving circuit 14" does not stop the stepping motor 11. When the stepping motor 11 reaches any one of the predetermined phases at a time instant (r), the motor driving circuit 14" automatically stops the stepping motor 11 and performs the power saving operation to hold the stepping motor 11 at that predetermined phase.

As is apparent from the above description, in accordance with each of the first to third embodiments described above, even if the system control circuit 19 inputs an instruction to execute a predetermined operation, the system control circuit 19 does not execute the predetermined operation until the stepping motor 11 reaches any one of predetermined phase positions, and if the stepping motor 11 reaches a predetermined phase position, the system control circuit 19 automatically executes the predetermined operation.

Accordingly, the system control circuit 19 can input the instruction to execute the predetermined operation to the motor driving circuit (14, 14' or 14") at an arbitrary timing without being restricted by the position of the stepping motor 11.

Accordingly, after the system control circuit 19 inputs the instruction to execute the predetermined operation, the system control circuit 19 can perform another processing without waiting for the completion of the processing of the predetermined operation, so that it is possible to reduce the temporal load of the system control circuit 19. Accordingly, it is possible to prevent the problem that the motor driving circuit stops the stepping motor 11 at a halfway phase of the current waveform to produce a discrepancy between an actual position of the lens and an address calculated by the system control circuit 19, thereby impeding an autofocus or zooming operation of the video camera system. It is, therefore, possible to achieve highly accurate control, whereby it is possible to realize an apparatus of good efficiency and high reliability.

(Fourth Embodiment)

A fourth embodiment of the present invention will be described below.

The above description of the first to third embodiments has referred to a lens controlling apparatus, an automatic focus adjusting apparatus and a motor controlling apparatus which are suitable for use in a still camera or a video camera. The fourth embodiment which will be described later relates to the movement and position control of a lens in a lens controlling apparatus, such as an automatic focus adjusting apparatus, and, more particularly, to a lens controlling apparatus which has a power consumption reduced on the basis of the optical characteristics of a lens system so that the lens controlling apparatus can operate optimally and efficiently according to the status of photography, the state of lens driving or the like.

The field of industrial application of the fourth embodiment will be described below. In the fields of still cameras and video cameras for domestic use, a demand for a further reduction in the size and weight of a camera body has recently become greater and greater, and the development of small lens systems having high performance has been promoted.

In the field of video cameras for domestic use, instead of a front-focus type lens system which was a mainstream lens system several years ago, a rear-focus type lens system arranged to perform a focusing operation by using a lens other than a front lens has recently been introduced into many products.

The front-focus type lens system is a lens system arranged to adjust focus by using a lens located nearest to a subject, and has a DC motor and a speed reduction gear for driving a large front lens, and a cam ring and the like for causing a variator lens and a compensation lens to move interlockingly. As a result, the entire front-focus type lens system has a large size.

In contrast, since the rear-focus type lens system drives a light-weight rear lens group for the purpose of focusing, there is no need to use the aforesaid elements, such as a speed reduction gear, incorporated in the front-focus type lens system. Accordingly, the rear-focus type lens system can use a small-sized actuator having a comparatively small torque.

As is also well known, the rear-focus type lens system does not use the aforesaid cam ring and has a focusing lens behind the variator lens so that the focusing lens can perform a compensation function for correcting a displacement of a focal plane due to a magnification varying operation. This feature greatly contributes to a reduction in the entire size of the rear-focus type lens system.

In such a rear-focus type lens system, the recent trend is to use stepping motors as actuators for driving the variator lens and the focusing lens, respectively, for various reasons such as good speed response, good driving response, high position accuracy and ease of control.

Methods for driving the stepping motors are classified into three kinds according to individual uses: 1-phase excitation, 2-phase excitation and 1-2-phase excitation. These three methods can be appropriately used according to the kind of target to be driven.

However, there are a number of problems in the above-described arrangement which employs the stepping motors as such actuators. For example, if a lens is to be held at a position at which the lens is stopped (stop position), it is necessary to continue to supply a holding current to maintain an excitation phase associated with the stop position. The holding current may be smaller than the driving current required for driving the stepping motor, but if the holding current, which is a direct current, continues to flow for a long time, electrical power is consumed and heat is generated even while the lens is not being driven. This leads to a great problem, particularly when a battery is used as a power source.

The 1-phase excitation is convenient for power saving because even if the supply of current to the stepping motor is shut off when the stepping motor is in a stopped state, the magnetic poles of the rotor and the magnetic poles of the stator are opposed to each other and the stop position at which the stepping motor is in the stopped state is held by the magnetic force produced by the magnet of the rotor. However, since the angle of rotation for each step is large, the 1-phase excitation is not suitable for use in a mechanism, such as a lens, which requires highly accurate positioning.

The 2-phase excitation can realize high position accuracy with respect to the 1-phase excitation since the stepping motor stops at an intermediate position between two phases. However, to stably hold the stop position of the stepping motor, it is necessary to continue to supply at least a holding current to each coil of the stepping motor even while the stepping motor is in a stopped state. This leads to the aforementioned problems of power consumption and heat generation.

In the 1-2-phase excitation, when the stepping motor is stopped at a 1-phase stop position, even if the current supplied to the stepping motor is shut off, the stepping motor can be held at that stop position. However, if the stepping motor is stopped at a 2-phase stop position, it is necessary to supply the holding current to the stepping motor so that the 2-phase stop position can be held. The power consumption due to the holding current cannot be ignored, particularly in the case of a battery power source, even if the supply of the holding current is decreased to a lower limit below which the stop position of the stepping motor cannot be held.

Accordingly, whichever of the above-described driving methods is employed, it is impossible to realize satisfactory driving control.

The fourth embodiment is directed to solving the above-described problems, and is intended to provide a lens controlling apparatus capable of optimally satisfying conditions indispensable for, particularly, camera lens control, such as high position accuracy, good speed response, good driving response and low power consumption. The feature of the fourth embodiment resides in an arrangement which includes a lens system having a lens group and an iris, an actuator for moving the lens group, driving means for driving the actuator, lens position detecting means for detecting a position of the lens group, state-of-iris detecting means for detecting a state of the iris, and control means for controlling the driving means on the basis of information obtained from an output of the state-of-iris detecting means and controlling a stop position of the lens group.

According to the feature of the fourth embodiment, if it is not necessary to strictly manage the stop position of the lens group for reasons such as a great depth of field, the actuator, such as a stepping motor, is made to rotate by one step within the depth of field to stop at a 1-phase stop position even if the actuator is stopped at a 2-phase stop position, and the holding current is reduced to zero. Accordingly, it is possible to realize a far greater power saving.

The fourth embodiment of the present invention will be described in detail below in sequence with reference to the accompanying drawings.

A rear-focus type lens controlling system for a video camera system according to the fourth embodiment is similar to that used in the first embodiment shown in FIG. 5, and an actuator for driving the focusing lens 5 and a drive transmission system are similar to those used in the first embodiment shown in FIG. 6. Accordingly, the fourth embodiment will be described with specific reference to FIGS. 5 and 6.

The fourth embodiment is particularly effective in an arrangement which needs accurate control of a focusing lens, such as a rear-focus type lens system.

Referring to FIG. 5, light image information, which is transmitted through the front lens 1, the zooming lens 2, the iris 3, the fixed, image forming lens 4 and the focusing lens 5, is photoelectrically converted into electrical image information by the image pickup device 15. The electrical image information passes through the amplifier 16 to the band-pass filter (BPF) 17. The BPF 17 extracts from the image signal only a high-frequency component the level of which varies according to the state of focus, and transmits the high-frequency component to the system control circuit 19.

The output signal of the BPF 17 is, for example, converted from analog to digital by, and inputted into, the system control circuit 19. As is well known, as the focusing lens 5 approaches an in-focus position, the amount of high-frequency component contained in an image signal obtained by photographing a subject increases. Accordingly, if the system control circuit 19 controls the position of the focusing lens 5 so that the A/D conversion value becomes a maximum, it is possible to automatically effect a focusing operation.

Figure 13:
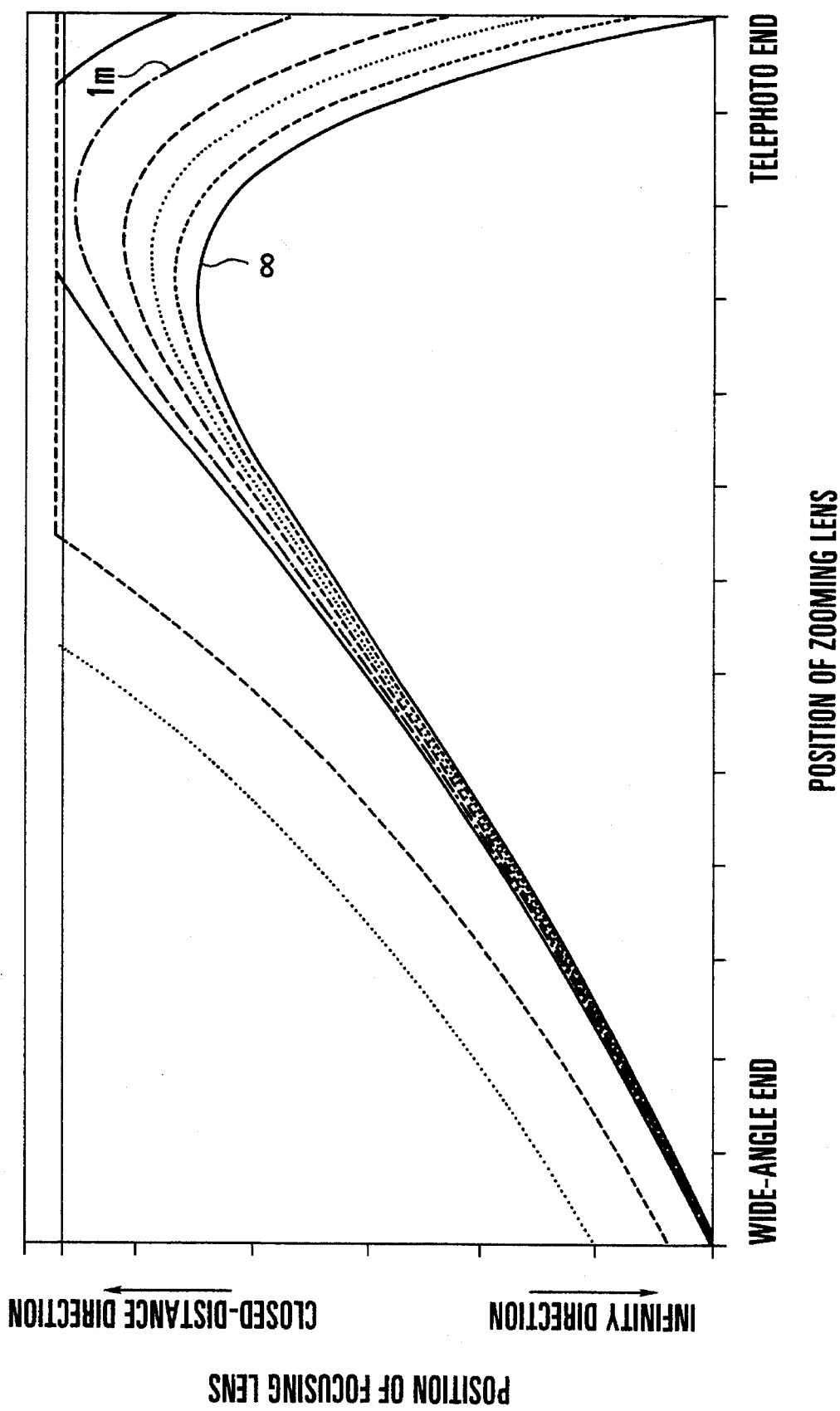
FIG. 13 is a characteristic chart showing the variation of a focal plane of an inner focusing lens which focal plane varies according to a magnification varying operation.

FIG. 13 shows the movement loci of the focusing lens 5 for correcting the focal plane while maintaining an in-focus state during a magnification variation in the rear-focus type lens system. The horizontal axis represents the position of the zooming lens 2 and the vertical axis represents the position of the focusing lens 5, i.e., a subject distance. The loci differ among individual subject distances.

Assuming that the moving speed of the zooming lens 2 is constant, while the zooming lens 2 is moving from a wide-angle end toward the vicinity of a middle area, any of the loci shows an approximately linear variation and the moving speed of the focusing lens 5 does not greatly vary. In the vicinity of the middle area in which the direction of the inclination of the loci changes, the focusing lens 5 is sharply reduced in speed and brought into a substantially stopped state. When the focusing lens 5 passes through the substantially stopped state toward a telephoto end, the inclination of the loci becomes sharp so that it is necessary to move the focusing lens 5 at a high speed in the vicinity of the telephoto end.

It is also apparent that if the motion of the zooming lens 2 and the motion of the focusing lens 5 do not approximately completely coincide with each other, the position of the zooming lens 2 or the focusing lens 5 deviates from any of the loci of FIG. 13 so that a noticeably defocused image occurs during a magnification varying operation.

For this reason, an actuator for the focusing lens 5 requires a wide range of accurate speed response and good driving response as well as high position accuracy. As an actuator which can suitably satisfy such requirements, a stepping motor is available.

If the focusing lens driving system is arranged as shown in FIG. 6, the focusing lens 5 cannot be correctly driven unless the load of the actuator is not lightened to a particular extent. However, the focusing lens 5 in the rear-focus type lens system is comparatively light as described previously, and in the arrangement using the stepping motor 11 as shown in FIG. 6, it is possible to drive the stepping motor 11 up to a rotational speed of approximately 500 pps without any problem.

Many actual products employ such a stepping motor for driving a focusing lens in the rear-focus type lens system.

Methods of driving the stepping motor are generally classified into three driving methods: the 1-phase excitation shown in FIG. 14(a), the 2-phase excitation shown in FIG. 14(b) and the 1-2-phase excitation shown in FIG. 14(c). The waveforms shown on the right side of the table of each of FIGS. 14(a), 14(b) and 14(c) represent the phase relationships between voltages applied to the terminals of the actuator. In practice, to eliminate noise, vibration or the like, a trapezoidal waveform having inclined rising and falling edges or a waveform which sinusoidally rises or falls are often employed instead of a rectangular waveform such as each of the excitation waveforms shown in FIGS. 14(a), 14(b) and 14(c). In any case, the shown phase relationships do not change.

FIGS. 15(a), 15(b) and 15(c) show the rotation of the rotor of a stepping motor when driven by the respective excitation methods shown in FIGS. 14(a), 14(b) and 14(c). The employed stepping motor has two coils: an A-$\overline{A}$ phase coil and a B-$\overline{B}$ phase coil. The magnetic fields generated from the respective coils are guided to the positions shown in FIGS. 15(a), 15(b) and 15(c).

In the case of the 1-phase excitation, the rotor moves so that the magnetic poles of the rotor can be necessarily opposed to the magnetic poles of a stator as shown in FIG. 15(a). More specifically, referring to the magnetic poles of the rotor which are respectively indicated by arrows in FIG. 15(a), the polarity of the $\overline{A}$ phase is N in the case of the state of "1" shown in FIG. 14(a), and in the case of the state (1) shown in FIG. 15(a), the S-pole of the rotor indicated by the arrow is opposed to the $\overline{A}$ phase. When the state "2" shown in FIG. 14(a) is reached, the polarity of the $\overline{B}$ phase becomes N, so that the magnetic pole of the rotor indicated by the arrow moves to the $\overline{B}$ phase in the case of the state (2) shown in FIG. 15(a). In other words, it is possible to produce a rotation of 18° for one variation in magnetic pole of the stator.

In the case of the 2-phase excitation, magnetic fields vary as shown in FIG. 14(b), and the rotation of the rotor is as shown in FIG. 15(b). In the case of the 2-phase excitation, the rotor moves so that the magnetic pole of the rotor indicated by the arrow can be opposed to the intermediate position between the magnetic poles of the stator. Similarly to the case of the 1-phase excitation, it is possible to produce a rotation of 18° for a single variation in magnetic pole of the stator.

In the case of the 1-2-phase excitation, since the 1-phase excitation and the 2-phase excitation are alternately repeated, if the rotor starts its rotation from the position where the magnetic pole of the rotor indicated by the arrow is opposed to one of the magnetic poles of the stator as shown in a state (1) of FIG. 15(c), when the next variation in magnetic pole appears, the magnetic pole of the rotor moves to the intermediate position between the opposite magnetic pole and the next magnetic pole of the stator. Further, when the next variation in magnetic pole appears, the rotor moves so that the magnetic pole of the rotor can be opposed to the magnetic pole of the stator next to the opposite magnetic pole. Accordingly, the amount of rotation of the rotor obtainable for a single variation in magnetic pole of the stator is 9° which corresponds to ½ of the amount of rotor rotation obtainable through the 1-phase excitation or the 1-2-phase excitation.

In an arrangement using such a stepping motor, if it is not necessary to move the focusing lens 5 from the current position thereof, in each of the excitation methods shown in FIGS. 15(a), 15(b) and 15(c), the motor driving circuit 14 continues to supply current to the motor coils so that the excitation phase at that time can be held. If the rotor is inhibited from rotating, the excitation phase does not vary. Accordingly, direct current is supplied to each of the motor coils as the holding current for holding the excitation phase at that time. Since only the coils serve as loads, the magnitude of the holding current per coil is between several tens of milliamperes and several hundred milliamperes and a considerable amount of heat is generated.

Figure 16:
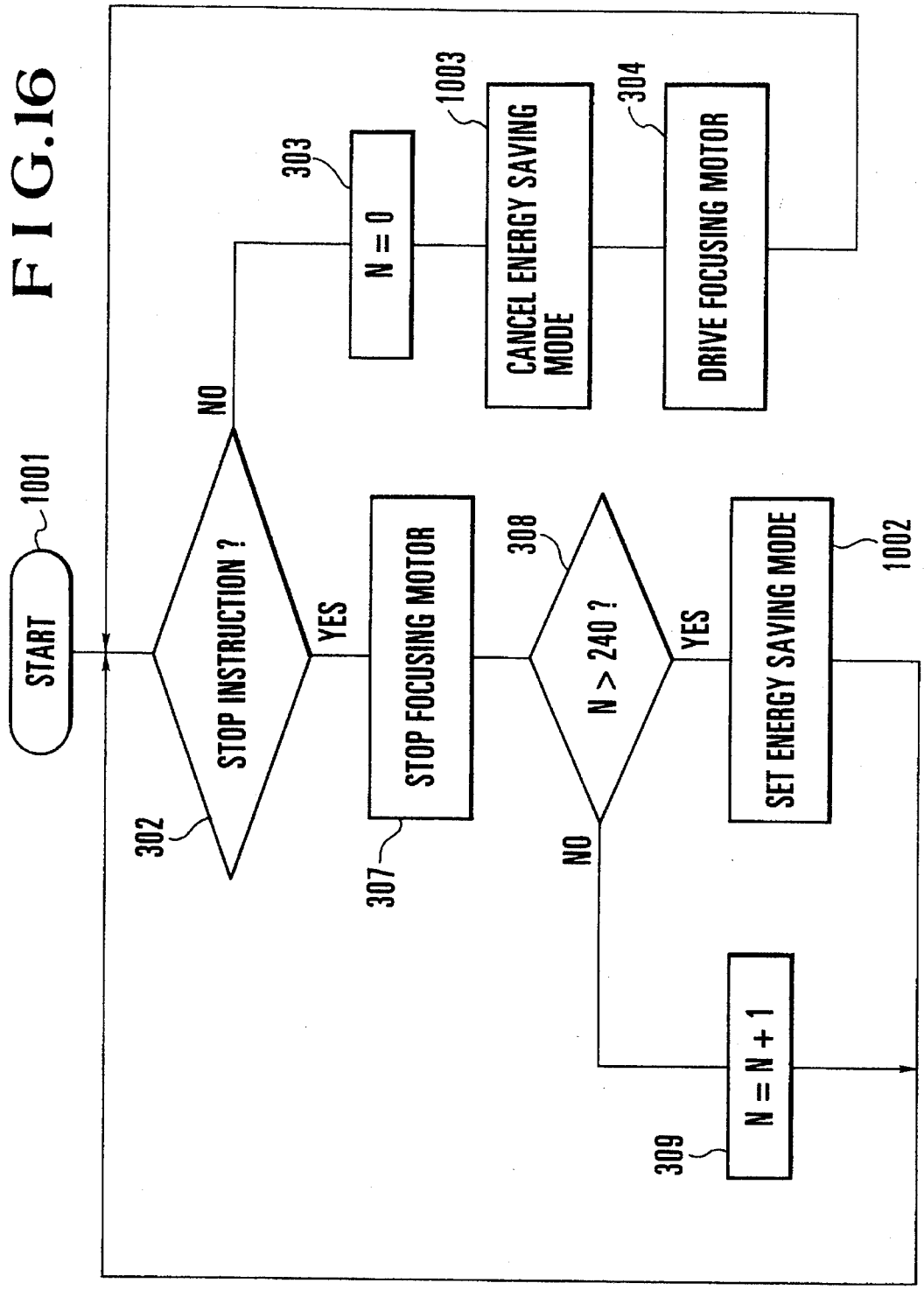
FIG. 16 is a flowchart aiding in describing a power saving mode according to a fourth embodiment of the present invention, the power saving mode being active when the stepping motor is in a stopped state.

FIG. 16 is a flowchart showing current saving control to be executed when the stepping motor is in a stopped state.

By supplying a control output based on the current saving control to a driving circuit which will be described later, it is possible to reduce the power consumption during the stopped state.

Referring to FIG. 16, when the processing is started in Step 1001, it is determined in Step 302 whether a stop instruction is outputted.

If no stop instruction is outputted, a counter N is cleared to zero in Step 303 and an energy saving mode is cancelled in Step 1003. In Step 304, driving current is supplied to the motor coils. The counter N is provided for counting a predetermined time after the stepping motor stops, and the time required for the stepping motor to stop stably is set to a count value of, for example, "240" in the counter N and it is determined on the basis of the count value whether the stepping motor has reached a stably stopped state.

If it is determined in Step 302 that a stop instruction is outputted, the transmission of driving pulses is inhibited to stop the stepping motor in Step 307. In Step 308, it is determined whether the value of the counter N has exceeded a predetermined value (in FIG. 16, the threshold "240"). If the value of the counter N has not yet exceeded the predetermined value, the counter N is incremented in Step 309, and the process returns to Step 302.

If it is determined in Step 308 that the value of the counter N has exceeded the predetermined value, the energy saving mode is set in Step 1002 to suppress the amount of current being supplied. The counter N is also provided for monitoring the stepping motor to determine whether the stepping motor continues its stopped state for a time. Specifically, the current being supplied is limited immediately after the stepping motor has stopped, but if driving of the stepping motor is to be restarted immediately, such current limitation is not performed so that the restarting can be smoothly executed.

In the above-described processing, the process waits for a certain time to elapse after the stepping motor has been brought into a stopped state, and if the possibility that the stepping motor continues the stopped state becomes high, the amount of current being supplied to the stepping motor placed in the stopped state is suppressed, whereby it is possible to achieve current saving and suppression of heat generation.

Individual cases in which the processing of FIG. 16 is applied to the respective excitation methods shown in FIGS. 15(a), 15(b) and 15(c) will be described below.

In the case of the 1-phase excitation shown in FIG. 15(a), even if no holding current is supplied when the stepping motor is in a stopped state, the stepping motor is necessarily stopped with the magnetic poles of the rotor respectively opposed to the magnetic poles of the stator. Accordingly, the rotor made from a permanent magnet and the stator made of metal attract each other with a sufficient strength so that unnecessary rotation of the rotor can be prevented.

Also, in the structure shown in FIG. 6, even if the focusing lens 5 is made to move in parallel with the optical axis with the result that a force acting to rotate the rotor of the stepping motor 11 is applied thereto, so far as the force is not considerably large, the rotor does not rotate because of the mechanical structure of the stepping motor 11.

Figure 17:
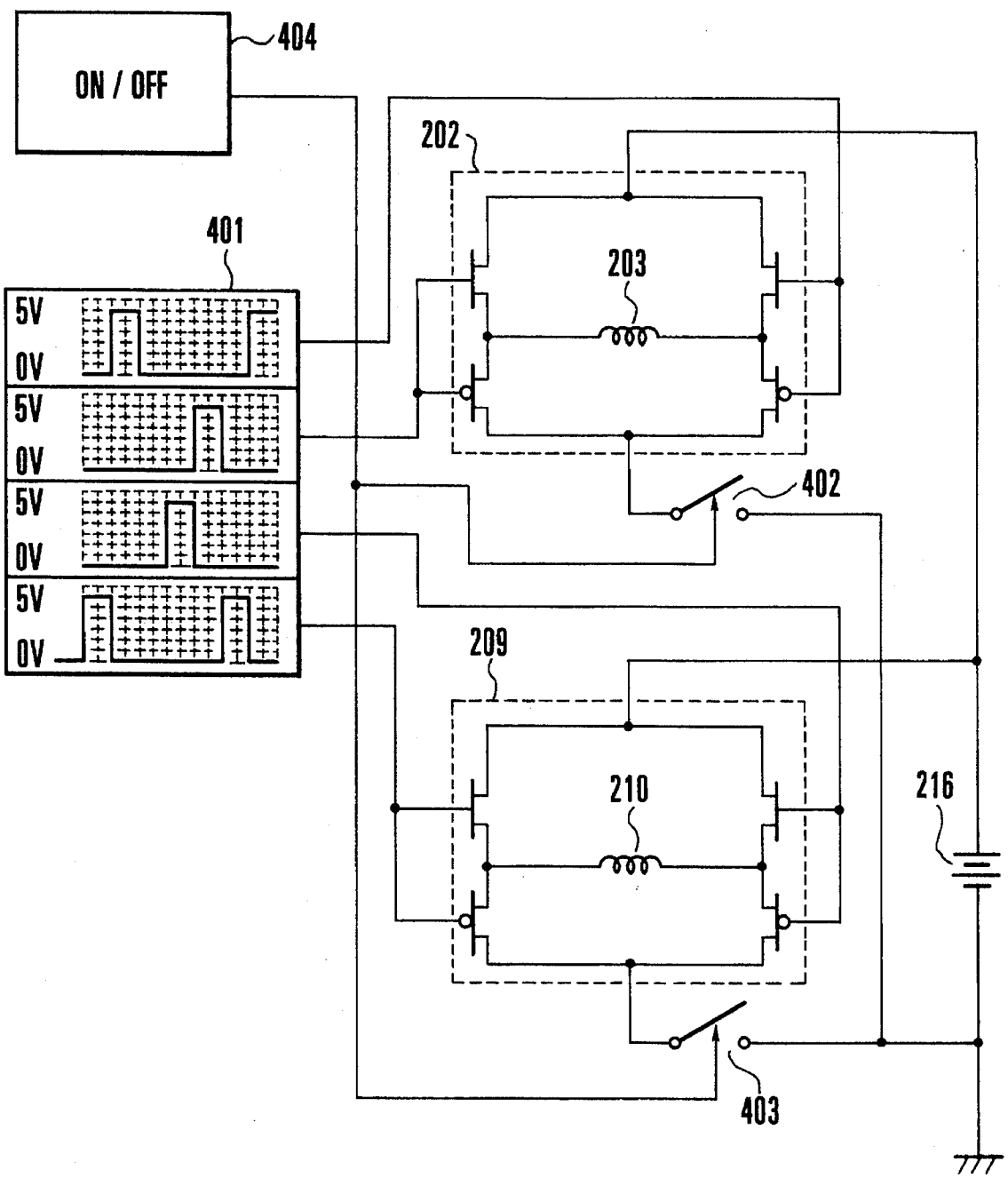
FIG. 17 is a diagram showing the arrangement of a driving controlling circuit for carrying out a 1-phase excitation driving method according to the fourth embodiment.

FIG. 17 is a schematic diagram of the arrangement of a motor driving system for rotating the stepping motor by 1-phase excitation, and the motor driving system has the function of shutting off the supply of current to the stepping motor which is in a stopped state.

Referring to FIG. 17, a driving controlling circuit 401 is provided for outputting an excitation pattern to a motor driving circuit. As specifically shown in FIG. 5, a driving pulse is transmitted from the system control circuit 19 to the motor driving circuit (driver) 12 or 14, and driving current based on the driving pulse is outputted from the motor driving circuit 12 or 14.

The shown motor driving system also includes switches 402 and 403 for respectively turning on/off the supply of the driving current to an A-$\overline{A}$ phase coil 203 and a B-$\overline{B}$ phase coil 210, a switch controlling circuit 404 for controlling the switches 402 and 403, an A-$\overline{A}$ phase H bridge circuit 202, a B-$\overline{B}$ phase H bridge circuit 209, the A-$\overline{A}$ phase coil 203, the B-$\overline{B}$ phase coil 210 and a power source 216.

Figure 18:
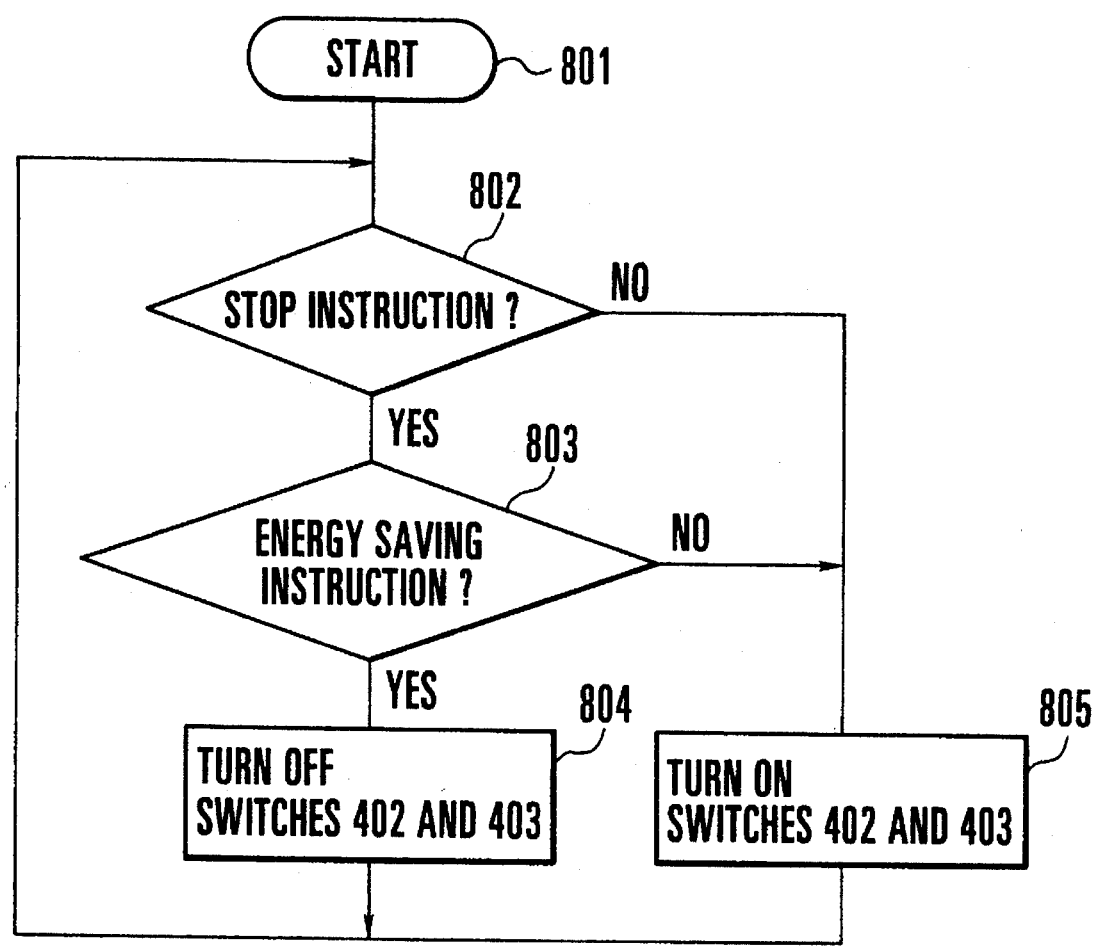
FIG. 18 is a flowchart aiding in describing the operation of the driving controlling circuit shown in FIG. 17.

The switch controlling circuit 404 shown in FIG. 17 controls the switches 402 and 403 in accordance with the flowchart of FIG. 18 and shuts off the supply of the driving current to the A-$\overline{A}$ phase coil 203 and the B-$\overline{B}$ phase coil 210 when the stepping motor is in a stopped state. The processing shown in FIG. 18 is executed after the processing of FIG. 16 is executed. A motor driving/stopping instruction is outputted within the system control circuit 19 and the switch controlling circuit 404 is contained in the system control circuit 19.

In the flowchart of FIG. 18, if the process is started in Step 801, it is determined in Step 802 whether a motor stopping instruction is outputted.

If the stepping motor is not in a stopped state, the process proceeds to Step 805, in which the switches 402 and 403 are closed so that the driving current can be supplied. If it is determined in Step 802 that the stepping motor is in a stopped state, the process proceeds to Step 803, in which it is determined whether an energy saving instruction is outputted. The energy saving instruction is outputted in Step 1002 of FIG. 16.

If it is determined in Step 803 that no energy saving instruction is outputted, the switches 402 and 403 are closed and grounded. If an energy saving instruction is outputted in Step 803, the switches 402 and 403 are opened in Step 804 to shut off the supply of current to the stepping motor.

By executing the above-described processing, it is possible to effect a power saving operation when the stepping motor is in the stopped state during the 1-phase excitation.

The case of the 2-phase excitation will be described below. As shown in FIG. 15(b), in the 2-phase excitation, the rotor necessarily stops so that each of the magnetic poles of the rotor can be opposed to the intermediate position between two adjacent magnetic poles of the stator. If the supply of current to the stator coils is shut off similarly to the case of the 1-phase excitation when the stepping motor is in the stopped state, the rotor may move by a ½ step so that each of the magnetic poles of the rotor will be opposed to either one of two adjacent magnetic poles of the stator, owing to the error of the magnetic poles of the stator that is introduced during assembling or a slight deviation of a stop position of the rotor.

For this reason, in the case of the 2-phase excitation, it is necessary to hold the excited state of the stator even when the stepping motor is in the stopped state. Specifically, in the 2-phase excitation, a current which suffices to maintain magnetic fields capable of at least holding the stop position of the rotor must be supplied even during the stopped state.

Figure 19:
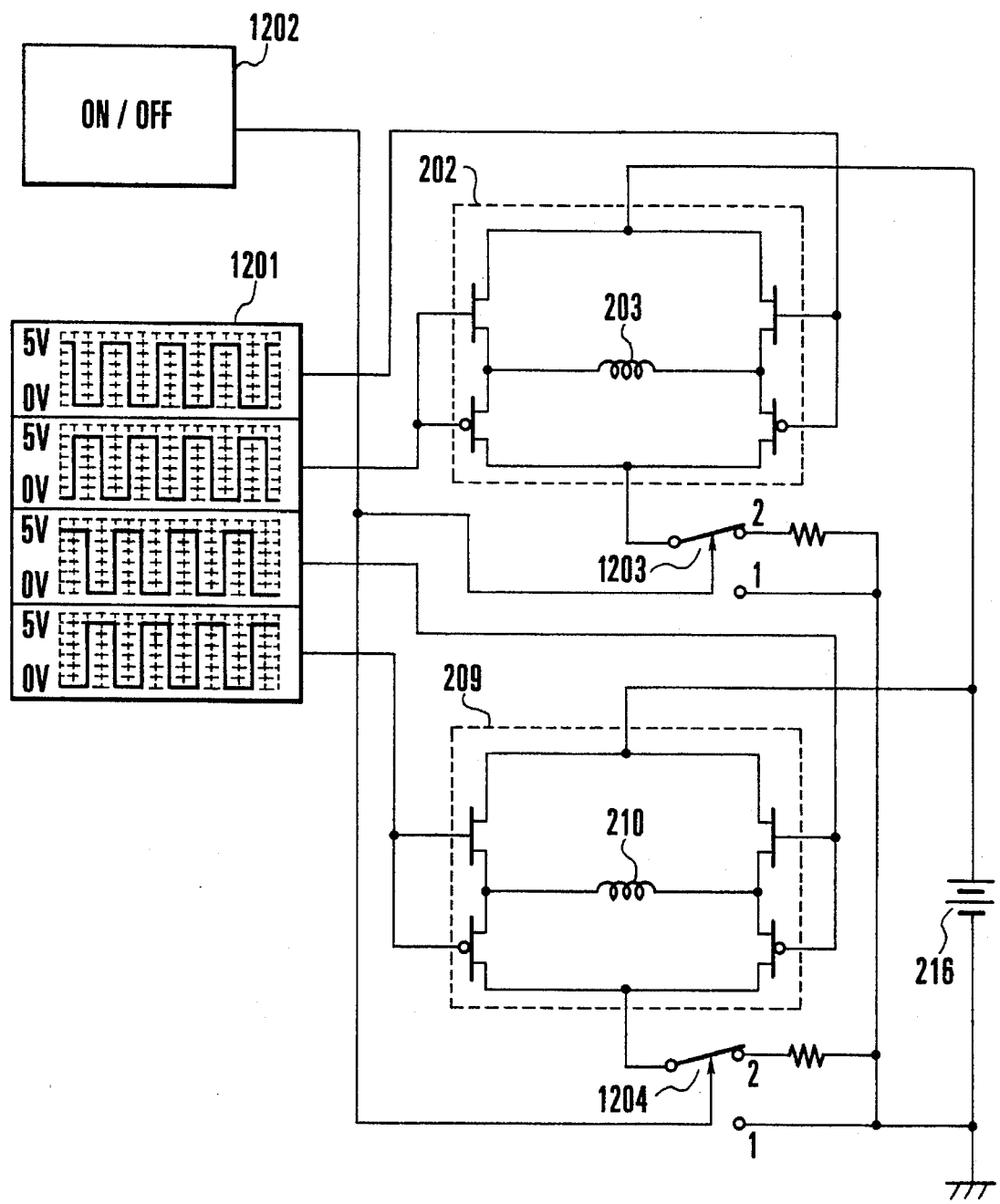
FIG. 19 is a diagram showing the arrangement of a driving controlling circuit for carrying out a 2-phase excitation driving method according to the fourth embodiment.

To realize the suppression of the amount of current being supplied when the stepping motor is in the stopped state, the circuit shown in FIG. 19 is employed. In the circuit shown in FIG. 19, a driving controlling circuit 1201 is provided for transmitting an excitation pattern to the driver. As specifically shown in FIG. 5, the excitation pattern is transmitted from the system control circuit 19 to the motor driving circuit (driver) 12 or 14, and driving current based on the excitation pattern is outputted from the motor driving circuit 12 or 14.

A switch controlling block 1202 is provided in the system control circuit 19 and serves to control switches 1203 and 1204. The control switches 1203 and 1204 are controlled by the switch controlling block 1202 so that each of the control switches 1203 and 1204 is connected to a terminal "1" during the driving of the stepping motor and to a terminal "2" during the stopped state of the stepping motor.

Figure 20:
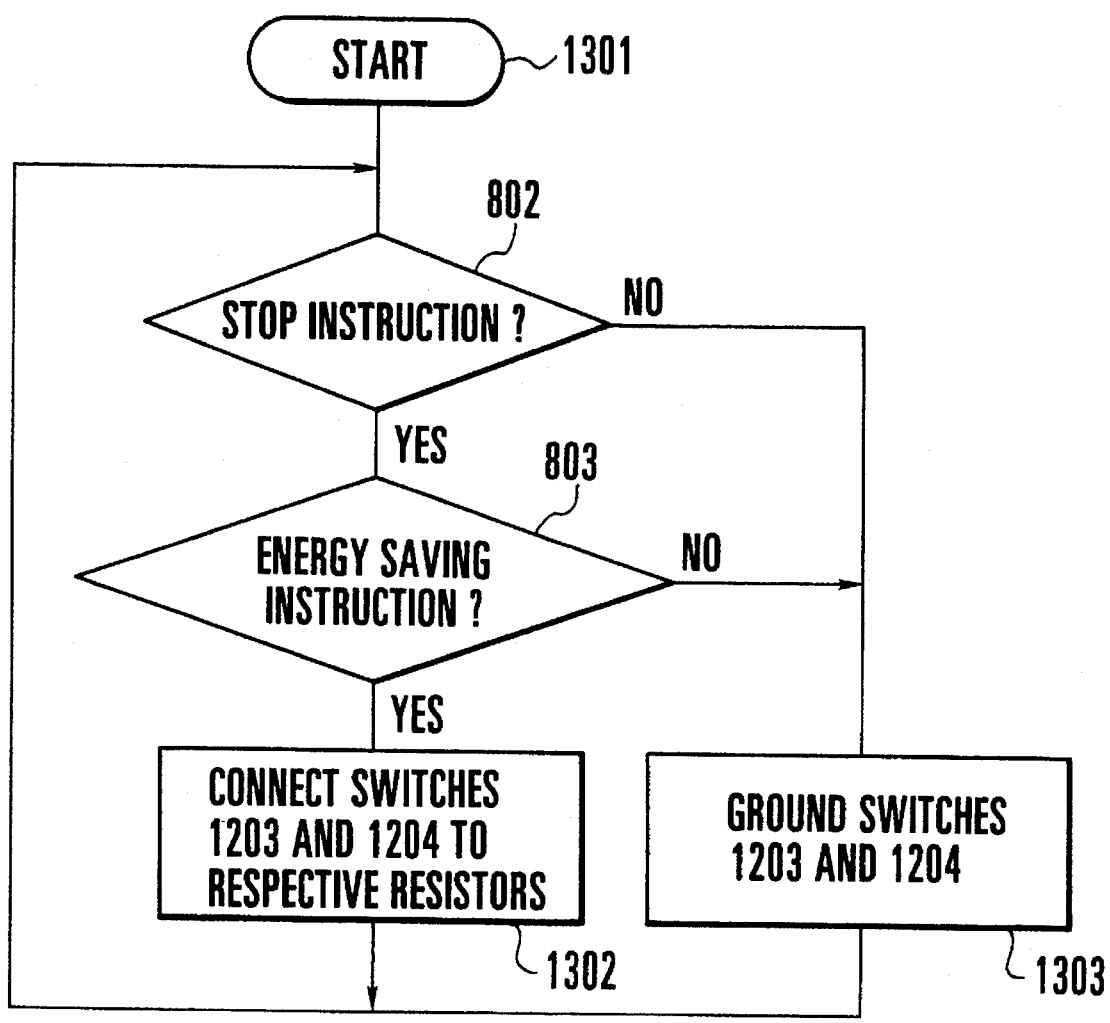
FIG. 20 is a flowchart aiding in describing the operation of the driving controlling circuit shown in FIG. 19.

The control operation of the switch controlling block 1202 is executed in accordance with the flowchart shown in FIG. 20, and the processing of FIG. 20 is executed after the processing of FIG. 16 has been executed. In the flowchart of FIG. 20, if the process is started in Step 1301, it is determined in Step 802 whether a stop instruction is outputted. If no stop instruction is outputted, the process proceeds to Step S1303, in which each of the switches 1203 and 1204 is grounded by being switched to the terminal "1" so that the driving current can be supplied to the coils of the stepping motor.

If it is determined in Step 802 that the stepping motor is in a stopped state, it is determined in Step 803 whether an energy saving instruction is outputted. If no energy saving instruction is outputted, the process proceeds to Step 1303, in which the supply of the driving current to the coils of the stepping motor is enabled. If an energy saving instruction is outputted, the process proceeds to Step 1302, in which each of the switches 1203 and 1204 is switched to the terminal "2" and grounded via a corresponding resistor, thereby supplying only the holding current to the stepping motor while suppressing the supply of the driving current.

Figure 21:
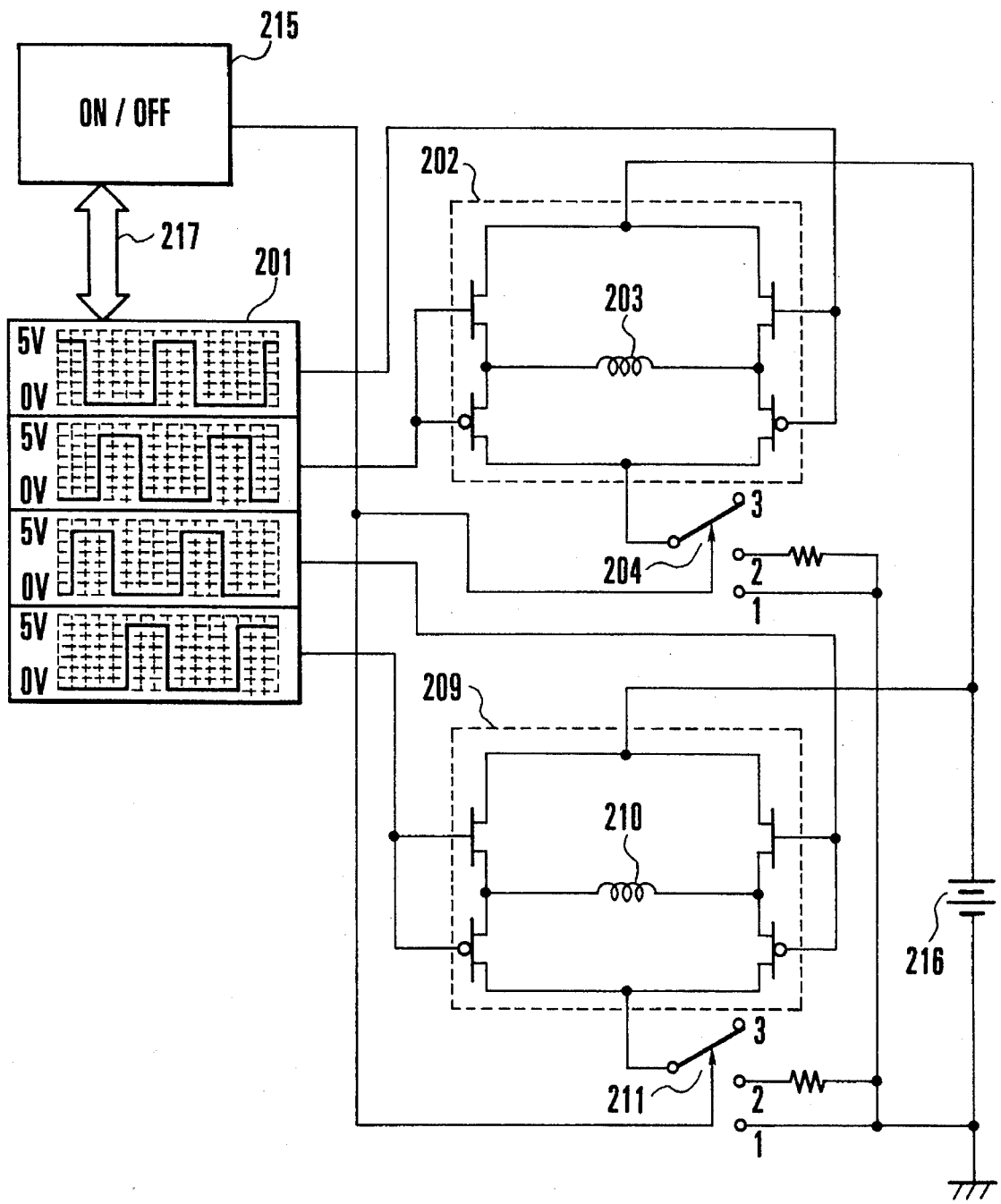
FIG. 21 is a diagram showing the arrangement of a driving controlling circuit for carrying out a 1-2-phase excitation driving method according to the fourth embodiment.

FIG. 21 shows a power saving motor driving circuit for implementing the 1-2-phase excitation shown in FIG. 15(c).

In the circuit shown in FIG. 21, a driving controlling circuit 201 is provided for outputting an excitation pattern to the driver. As specifically shown in FIG. 5, a driving pulse is transmitted from the system control circuit 19 to the motor driving circuit (driver) 12 or 14, and driving current based on the driving pulse is outputted from the motor driving circuit 12 or 14.

The shown circuit also includes switches 204 and 211 for respectively varying the amount of supply of the driving current to the A-$\bar{\text{A}}$ phase coil 203 and the B-$\bar{\text{B}}$ phase coil 210, and a Switch controlling circuit 215 for controlling the switches 204 and 211.

The switch controlling circuit 215 and the driving controlling circuit 201 are connected by a communication path 217, so that the switch controlling circuit 215 can at all times detect whether the stepping motor is in the state of the 2- or 1-phase excitation.

Figure 22:
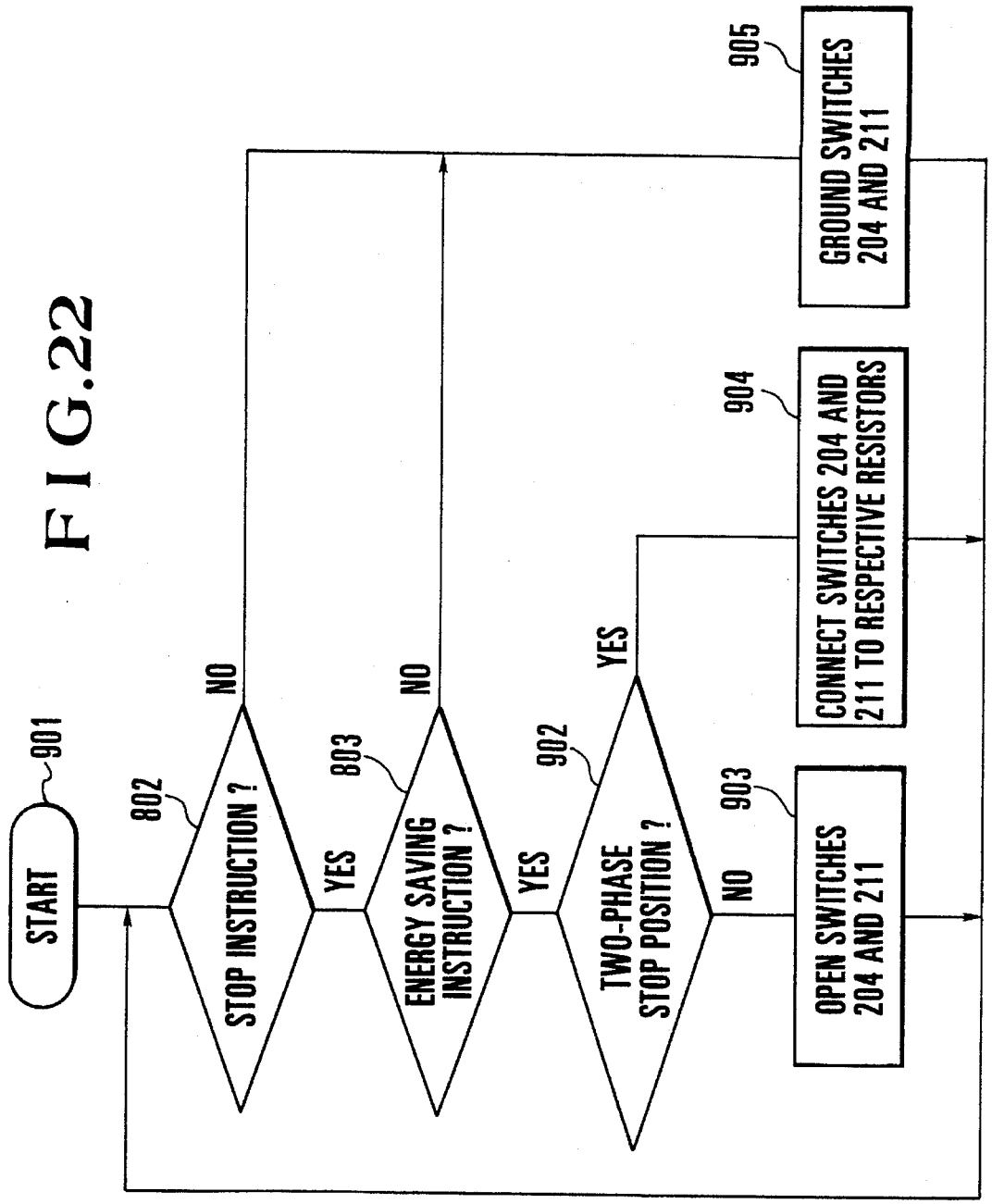
FIG. 22 is a flowchart aiding in describing the operation of the driving controlling circuit shown in FIG. 21.

The control operation of the driving controlling circuit 201 is executed in accordance with the flowchart shown in FIG. 22. In the flowchart shown in FIG. 22, if the process is started in Step 901, it is determined in Step 802 whether a stop instruction is outputted. If no stop instruction is outputted, the process proceeds to Step 905, in which each of the switches 204 and 211 is grounded by being switched to the terminal "1" so that the driving current can be supplied to the coils of the stepping motors.

If it is determined in Step 802 that the stepping motor is in a stopped state, it is determined in Step 803 whether an energy saving instruction is outputted. If it is not determined that an energy saving instruction is outputted, the process proceeds to Step 905, in which the state in which the supply of current is enabled is maintained.

If it is determined in Step 803 that an energy saving instruction is outputted, the process proceeds to Step 902, in which it is determined whether the position at which the stepping motor is currently stopped corresponds to a 2-phase stop position. If the current stop position of the stepping motor corresponds to the 2-phase stop position, the process proceeds to Step 904, in which each of the switches 204 and 211 is connected to the terminal "2" and grounded via a corresponding resistor, thereby supplying enough current to hold the current stop position of the stepping motor. If it is determined in Step 902 that the current stop position of the stepping motor corresponds not to the 2-phase stop position but a 1-phase stop position, the process proceeds to Step 903, in which each of the switches 204 and 211 is opened by being switched to a terminal "3", thereby shutting off the supply of the current.

As is apparent from the above description, energy saving can be achieved by discriminating between the 2-phase stop position and the 1-phase stop position and altering the process of limiting the amount of current.

(Fifth Embodiment)

In the above description, reference has been made to several specific methods for driving the stepping motor. According to such a driving method, while the rotor is stopped at the 2-phase stop position, it is necessary to supply a holding current, which is smaller than the current required to drive the stepping motor, to the coils thereof. However, although the amount of the holding current is limited by inserting the resistors, the amount of power consumption cannot be ignored as compared with the state in which the driving current is shut off.

Specifically, if the rotor is stopped at the 2-phase stop position, it is necessary to supply the holding current to both of the A-$\bar{\text{A}}$ phase coil and the B-$\bar{\text{B}}$ phase coil. Even if the amount of the holding current per coil is reduced to ½ of the amount of the driving current normally required to drive the stepping motor, the total amount of the holding current required for the two coils becomes equivalent to the amount of driving current which normally flows in each single coil. If the amount of the holding current is made extremely small, it is impossible to achieve the holding function proper to the holding current.

A fifth embodiment of the present invention which will be described below is directed to solving the above-described problem and is intended to realize a far greater power saving. According to the fifth embodiment, under particular photographic conditions such as a great depth of field of an optical element, if it is not necessary to strictly manage the stop position of the rotor of the stepping motor, the rotor of the motor is made to rotate by one step to stop at the 1-phase stop position even if the 2-phase stop position is a desired stop position, and the holding current is reduced to zero.

The fifth embodiment of the present invention will be described below with reference to FIG. 5 and FIGS. 21 through 24.

Figure 23:
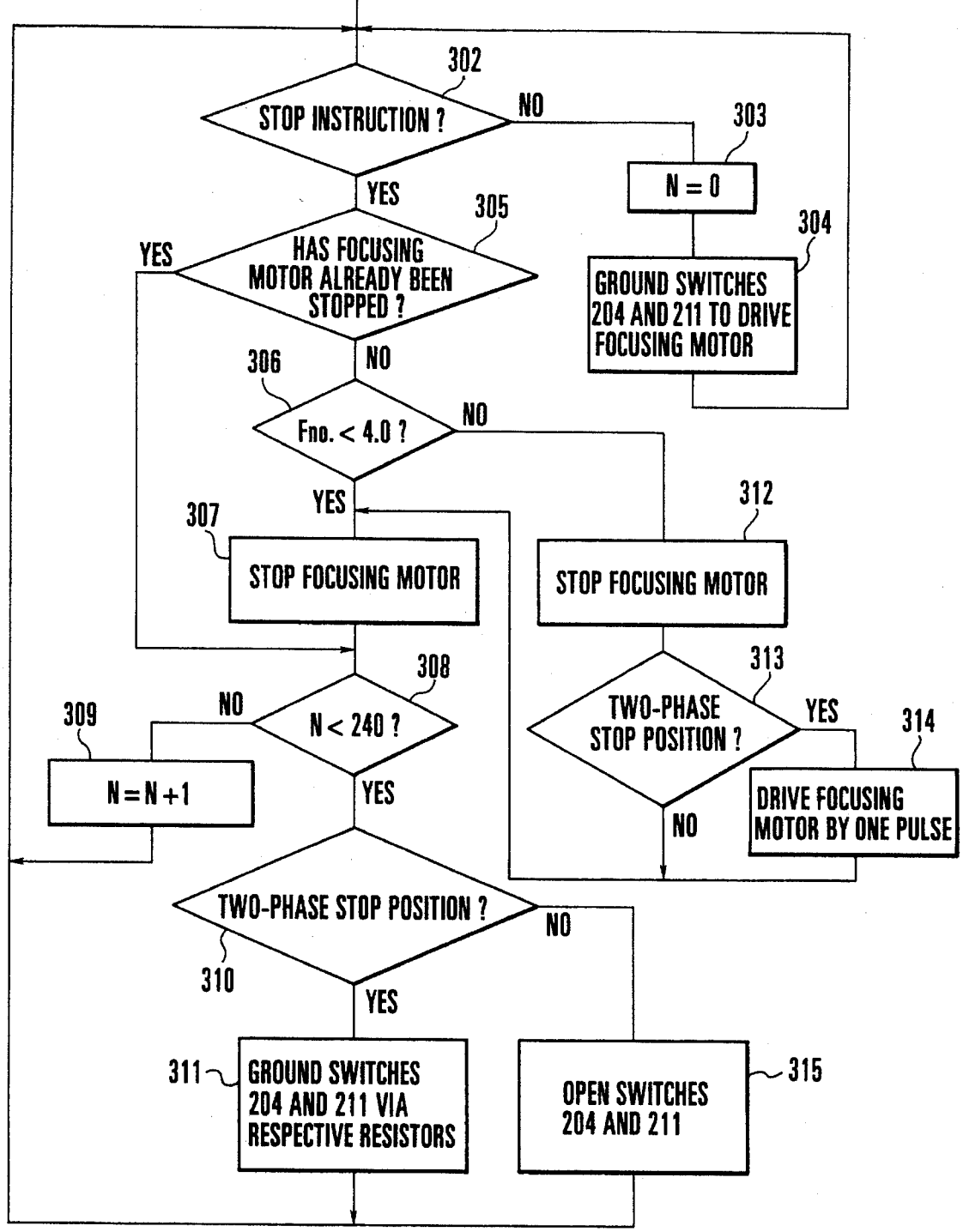
FIG. 23 is a flowchart showing the operation of a stepping motor driving controlling circuit according to a fifth embodiment of the present invention.

FIG. 23 is a flowchart showing a control operation distinctive of the fifth embodiment of the present invention. The entire system arrangement according to the fifth embodiment is as shown in FIG. 5, and the arrangement of a driving system that is associated with a power saving function itself is similar to that shown in FIG. 21, and the 1-2-phase excitation method is employed as a driving method.

As described above in connection with the above-described embodiments, the processing of FIG. 23 is executed within the switch controlling circuit 215, and the switch controlling circuit 215 is contained in the system control circuit 19.

In the flowchart of FIG. 23, if the process is started in Step 301, it is determined in Step 302 whether a stop instruction is outputted. If no stop instruction is outputted, the counter N is cleared to "0" in Step 303. In Step 304, each of the switches 204 and 211 is grounded by being switched to the terminal "1" so that the stepping motor 11 can be driven.

If it is determined in Step 302 that a stop instruction is outputted, the process proceeds to Step 305, in which it is determined whether the stepping motor 11 has already been stopped and the counter N which starts counting after the stepping motor 11 has been stopped has started its counting operation.

If the counter N has not yet started the counting operation and if the stop instruction is outputted to stop the stepping motor 11 and the processing of Step 305 is executed for the first time (the decision is NO), the process proceeds to Step 306. If the stepping motor 11 has already been stopped and the counter N has started the counting operation (the decision is YES), the process proceeds to Step 308.

In Step 306, the state of the iris 3 is checked. The state of the iris 3 is transmitted to the system control circuit 19 through the iris (position) encoder 7.

FIG. 24 is a table showing the numbers of step pulses of the stepping motor 11 with respect to different aperture values. If the maximum diameter of an allowable circle of confusion within which a person does not visually recognize a defocused image in an image pickup plane is constant, the amount of defocusing which produces such a maximum diameter of an allowable circle of confusion is converted into the amount of movement of the focusing lens 5, and the amount of movement of the focusing lens 5 is replaced with the number of step pulses of the stepping motor 11. The number of step pulses of the stepping motor 11 is the number of pulses for the 1-2-phase excitation method.

As can be seen from the number of step pulses shown in FIG. 24, if an aperture value is selected from among the aperture values not less than an F-number of 4.0 at which a defocused image exceeding the diameter of an allowable circle of confusion does not occur even if the stepping motor (focusing motor 11) is moved by ±2 or more pulses, no defocused image can be visually recognized even if the focusing lens 5 is made to stop at a 1-phase position adjacent to a correct 2-phase stop position. For this reason, in Step 306, it is determined whether an F-number not less than "4.0", i.e., an aperture not greater in diameter than "4.0", has been selected.

If it is determined in Step 306 that an F-number not less than "4.0" has been selected, the process proceeds to Step 312, in which the focusing lens 5 is made to stop, and it is determined in Step 313 whether the position at which the focusing lens 5 is stopped corresponds to a 2-phase stop position. In the case of the 2-phase stop position, in Step 314, the stepping motor 11 is stepped by one pulse and moved to a 1-phase stop position. In Step 307, the stepping motor 11 is made to stop, and the process proceeds to Step 308.

If it is determined in Step 306 that an F-number less than "4.0" has been selected, the process proceeds to Step 307, in which the stepping motor 11 is made to stop. In Step 308, the counter N starts the counting required to activate a power saving mode and the count value of the N is checked. The processing of Step 309→Step 302→Step 305→ Step 308 is repeated until the counting of the counter N is completed (N=240), and the process waits for the count value of the counter N to exceed a predetermined value. Thus, it is determined whether a predetermined time after the stop of the focusing lens driving motor 11 has elapsed.

If it is determined in Step 308 that the count value of the counter N has exceeded the predetermined value, it is determined in Step 310 whether the current stop position of the stepping motor corresponds to the 2-phase stop position or the 1-phase stop position. In the case of the 2-phase stop position, the process proceeds to Step 311, in which each of the switches 204 and 211 is switched to the terminal "2" and grounded via a corresponding resistor. If it is determined in Step 310 whether the current stop position of the stepping motor corresponds to not the 2-phase stop position but the 1-phase stop position, the process proceeds to Step 315, in which each of the switches 204 and 211 is opened by being switched to the terminal "3", thereby shutting off the supply of current to the stepping motor 11. Thus, the stepping motor 11 stops at the 1-phase stop position with the supply of current shut off.

In the above-described arrangement, by executing the above-described processing, the stepping motor can necessarily stop at the 1-phase stop position if at least the depth of field becomes great (an aperture value not less than "4.0"). Accordingly, when the stepping motor stops at the 1-phase stop position, energy saving can be effected by shutting off the supply of current to the stepping motor.

In the optical system shown in FIG. 5, since the focusing lens 5 is located closer to the image pickup plane than the zooming lens 2, the amount of variation of the depth of field due to a variation of the location of the zooming lens 2 is substantially negligibly small. Accordingly, in the fifth embodiment, only the variation of the depth of field depending on the aperture value is taken into account. In the case of an arrangement in which the depth of field varies depending on the position of the zooming lens 2, the table shown in FIG. 24 needs to be replaced with a two-dimensional table. Needless to say, the technical concept of the present invention can also be applied to such an arrangement.

Although, in the foregoing description, each of the above-described embodiments is used in the automatic focus adjusting system, the present invention is not limited to such an automatic focus adjusting system. For example, during a manual focus adjusting operation, as far as the depth of field is great, even if only the 1-phase stop position is employed as the stop position of the stepping motor, a photographer will never feel that defocusing has occurred.

Accordingly, the function of the present invention can be applied to any kind of adjusting means.

As is apparent from the foregoing description, in accordance with the fifth embodiment, the stepping motor is made to stop at the 2-phase stop position only in the case of a shallow depth of field, and if the depth of field is great, the stepping motor is made to stop at the 1-phase stop position. Accordingly, in practical use, if the stepping motor is in a stopped state, the holding current only needs to be supplied to the stepping motor when the depth of field is shallow. In any case other than the above, even if the stepping motor is made to stop at the 1-phase stop position, no defocused image is visually recognized since the depth of field is great. In this case, it is possible to shut off the supply of current to the stepping motor.

Accordingly, it is possible to reduce the amount of power consumption compared to the related art without impairing the accuracy of focusing.

What is claimed is:

1. A motor controlling apparatus, comprising:

(a) a motor;

(b) means for forming a driving current waveform to be supplied to said motor;

(c) means for inputting a stop instruction to stop said motor;

(d) means for executing the stop operation corresponding to the instruction;

(e) phase detecting means for detecting a phase of the driving current waveform; and (f) inhibiting means for inhibiting the stop operation of said motor when the phase of the drive current waveform detected by said phase detecting means is a predetermined phase.

2. A motor controlling apparatus according to claim 1, wherein said motor is a step motor.

3. A motor controlling apparatus according to claim 2, wherein said predetermined phase is a phase in which a rotor and a stator of said step motor are stabilized relative to each other.

4. A motor controlling apparatus according to claim 3, further comprising current restricting means for decreasing current to be supplied to said step motor after the step motor stops.

5. A motor controlling apparatus according to claim 1, wherein said stop instruction is issued from a micro-computer.

6. A motor controlling apparatus applicable to a video camera, comprising:

(a) a stepping motor;

(b) means for forming a motor driving current waveform to be supplied to said stepping motor;

(c) means for inputting a stop instruction to stop said stepping motor;

(d) means for stopping said stepping motor in accordance with the stop instruction;

(e) phase detecting means for detecting a phase of the motor driving current waveform; and (f) inhibiting means for inhibiting the stop instruction from being executed except when the phase of the motor driving current waveform detected by said phase detecting means is a predetermined phase.

7. A motor controlling apparatus according to claim 6, wherein the predetermined phase is a phase in which the rotor and the stator of said step motor are mutually stabilized.

8. A motor controlling apparatus according to claim 7, further comprising current restriction means for decreasing the current to be supplied to the step motor after the step motor stops.

9. A motor controlling apparatus according to claim 8, wherein the current restriction means cuts off the current to be supplied to the step motor when the step motor stops at the predetermined phase.

10. A motor controlling apparatus according to claim 8, wherein said inhibiting means memorizes the instruction and continues the drive of said step motor when said detecting means does not detect the predetermined phase.

11. A motor controlling apparatus, comprising:
  (a) a motor;
  (b) means for forming a driving current waveform to be supplied to said motor;
  (c) means for inputting an instruction to decrease a supply of current to said motor;
  (d) means for decreasing the supply of current to said motor in accordance with the instruction;
  (e) detecting means for detecting a phase of the driving current waveform; and
  (f) inhibiting means for storing the instruction and inhibiting the instruction from being executed except when the phase of the driving current waveform detected by said detecting means is a predetermined phase.

12. A motor controlling apparatus according to claim 11, wherein said phase detection means detects whether or not the rotor and the stator of said step motor are at a phase where the rotor and the stator are mutually stabilized.

13. A motor controlling apparatus applicable to a video camera, comprising:
  (a) means for forming a driving current waveform to be supplied to a motor;
  (b) means for inputting a stop instruction to stop the motor;
  (c) means for stopping the motor in accordance with the stop instruction;
  (d) means for inputting an instruction to decrease a supply of current to the motor;
  (e) means for decreasing the supply of current to the motor in accordance with the instruction to decrease the supply of current to the motor;
  (f) detecting means for detecting a phase of the driving current waveform; and
  (g) inhibiting means for inhibiting the instruction to decrease the supply of current to the motor from being executed except when the phase of the driving current waveform detected by said detecting means is a predetermined phase and the stop instruction is inputted.

14. A motor controlling apparatus according to claim 12, further comprising current restriction means for decreasing the current to be supplied to said step motor after said step motor stops.

15. A motor controlling apparatus according to claim 13, wherein said detecting means detects whether or not the phase is to mutually stabilize the rotor and stator of said step motor.

16. A motor controlling apparatus according to claim 15, further comprising current restriction means for decreasing the current to be supplied to said step motor after said step motor stops.

17. A motor controlling apparatus according to claim 15, wherein said inhibit means memorizes the instruction and continues the drive of said step motor when said detection means does not detect the predetermined phase.

18. A motor controlling apparatus, comprising:
  a motor,
  a drive circuit for driving said motor,
  phase detection means for detecting a rotation phase of said motor, and
  control means for supplying drive pulse to said drive circuit to drive said motor and, when a stop instruction for the motor is inputted and if it is judged on the basis of an output of said phase detection means that said motor is not at a predetermined rotation phase, detains execution of the stop instruction and continues supply of said drive pulse, and when said motor resumes the predetermined rotation phase, stops the supply of the drive pulse.

19. A motor controlling apparatus according to claim 18, wherein said motor is a step motor.

20. A motor controlling apparatus according to claim 19, wherein said phase detection means detects whether or not the phase provides a mutual rotation phase relation between the rotor and the stator of said motor.

21. A motor controlling apparatus according to claim 18, wherein said drive pulse is generated by a micro-computer.

22. A motor controlling apparatus according to claim 18, wherein said motor is used in a video camera.

* * * * *

UNITED STATES PATENT AND TRADEMARK OFFICE
CERTIFICATE OF CORRECTION

PATENT : 5,594,311
DATED : January 14, 1997
INVENTOR(S) : Yasuda et al.

It is certified that error appears in the above-identified patent and that said Letters Patent is hereby corrected as shown below:

Col. 17, line 16, delete "not".

Col. 21, line 11, delete "Switch" and insert --switch--.

Signed and Sealed this

Twenty-sixth Day of May, 1998

Attest:

BRUCE LEHMAN

Attesting Officer

Commissioner of Patents and Trademarks